(12) United States Patent  
Yokono et al.

(10) Patent No.: US 8,396,817 B2  
(45) Date of Patent: Mar. 12, 2013

(54) LEARNING APPARATUS, LEARNING METHOD, RECOGNITION APPARATUS, RECOGNITION METHOD, AND PROGRAM

(75) Inventors: Jun Yokono, Tokyo (JP); Yuichi Hasegawa, Tokyo (JP)

(73) Assignee: Sony Corporation, Tokyo (JP)

( * ) Notice: Subject to any disclaimer, the term of this patent is extended or adjusted under 35 U.S.C. 154(b) by 866 days.

(21) Appl. No.: 12/550,188

(22) Filed: Aug. 28, 2009

(65) Prior Publication Data

US 2010/0055654 A1 Mar. 4, 2010

(30) Foreign Application Priority Data

Sep. 4, 2008 (JP) ................. P2008-226690

(51) Int. Cl.
 *G06F 15/18* (2006.01)
 *G09B 19/00* (2006.01)
(52) U.S. Cl. ........................ 706/12; 434/155
(58) Field of Classification Search .............. 706/12; 434/155

See application file for complete search history.

(56) References Cited

U.S. PATENT DOCUMENTS

2012/0034581 A1* 2/2012 Chang et al. ............... 434/157

FOREIGN PATENT DOCUMENTS

| JP | 2005-100122 | 4/2005 |
| JP | 2007-80160 | 3/2007 |

OTHER PUBLICATIONS

Y. Freund, et al., "Experiments with a New Boosting Algorithm", Machine Learning: Proceedings of the Thirteenth International Conference, pp. 1-9 (1996).

* cited by examiner

*Primary Examiner* — Jeffrey A Gaffin  
*Assistant Examiner* — Ola Olude Afolabi  
(74) *Attorney, Agent, or Firm* — Finnegan, Henderson, Farabow, Garrett & Dunner, L.L.P.

(57) ABSTRACT

A learning apparatus includes a feature extractor for extracting a feature at a feature point in a plurality of training images including training images that contains a target object to be recognized and that does not contain the target object, a tentative learner generator for generating a tentative learner for detecting the target object in an image, where the tentative learner is formed from a plurality of weak learners through statistical learning using the training images and the feature obtained from the training images, and a learner generator for generating a final learner that is formed from at least one of the weak learners and that detects the target object in an image by substituting the feature into a feature function formed from some of the weak learners of the tentative learner so as to obtain a new feature and performing statistical learning using the new feature and training images.

13 Claims, 17 Drawing Sheets

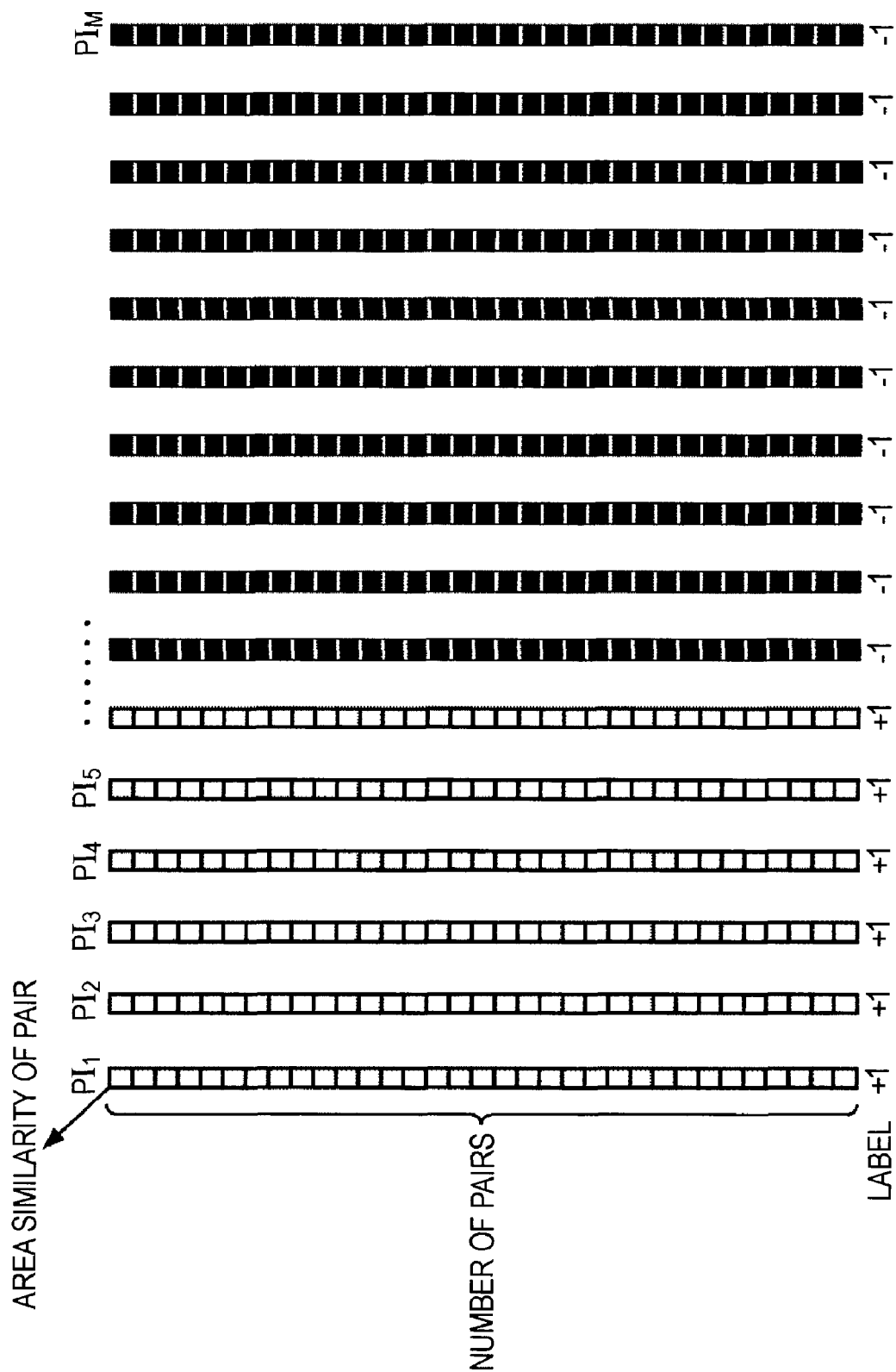

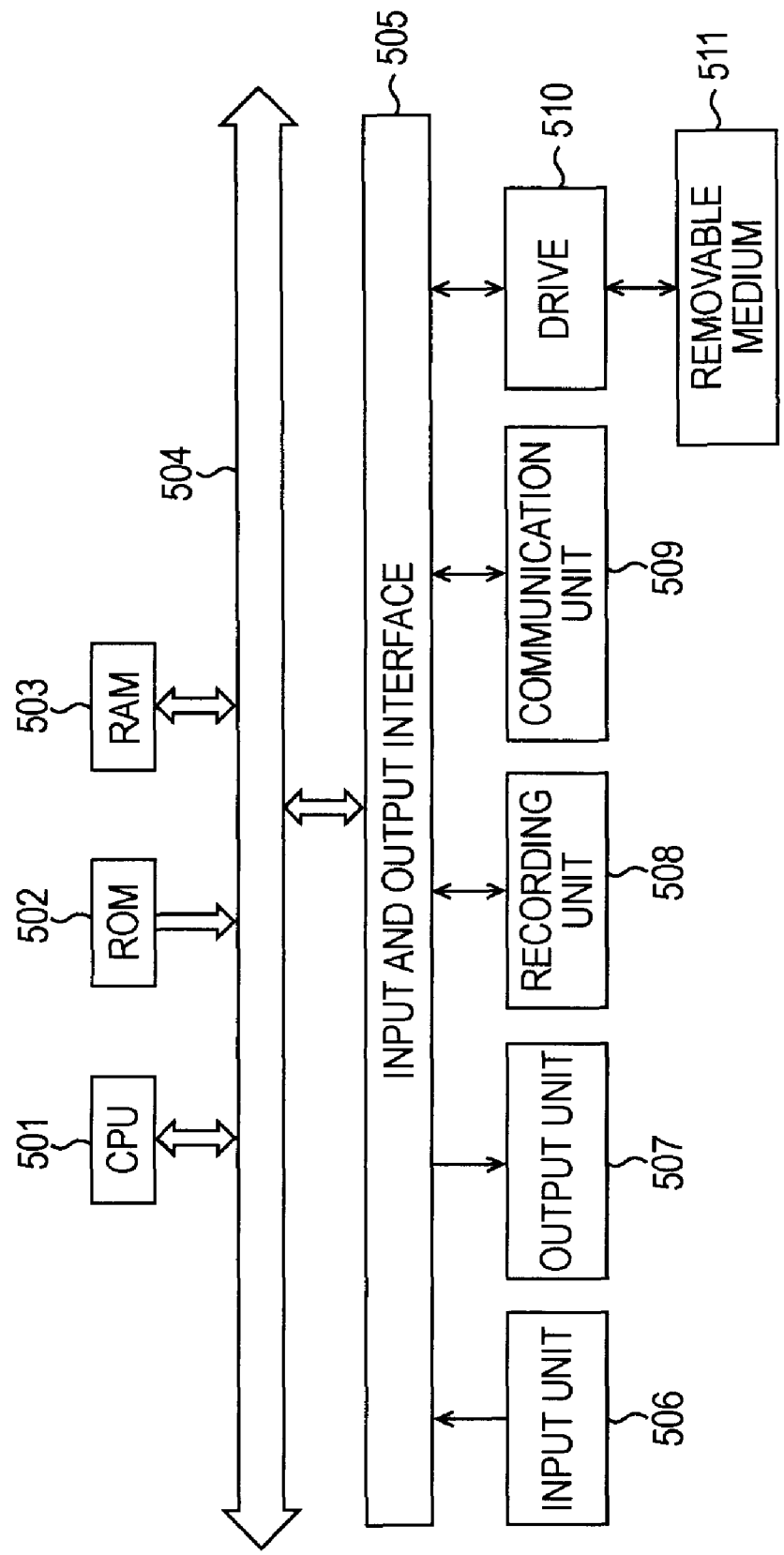

LEARNING APPARATUS, LEARNING METHOD, RECOGNITION APPARATUS, RECOGNITION METHOD, AND PROGRAM

BACKGROUND OF THE INVENTION

1. Field of the Invention

The present invention relates to a learning apparatus, a learning method, a recognition apparatus, a recognition method, and a program and, in particular, to a learning method, a recognition apparatus, a recognition method, and a program capable of reliably detecting a target object from an image.

2. Description of the Related Art

Statistical learning based on a Boosting algorithm has been used in a variety of image recognition tasks as an effective machine learning method. For example, as one of such machine learning methods, a statistical machine learning method called "AdaBoost" has been widely used (refer to, for example, Y. Freund, R. Schapire, "Experiments with a new boosting algorithm", IEEE Int. Conf. on Machine Learning, pp. 148-156, 1996).

In the AdaBoost method, a training image containing the image of a target object to be detected and a training image not containing the image of the target object are used as samples so that a weak learner is generated. A plurality of weak learners are combined so that a strong learner is generated. By using such a strong learner, a target object can be detected from a desired image.

SUMMARY OF THE INVENTION

However, in the above-described technologies, if, in particular, the number of samples (training images) used for machine learning is small, over-fitting occurs. Accordingly, it is difficult to increase the detection accuracy of a target object in an image.

That is, a learner obtained through over-fitting can precisely detect a target object similar to the target object contained in a training image used as a sample. However, the detection accuracy of a target object that is not very similar to the target object contained in the training image (hereinafter referred to as a "dissimilar target object") is low. As used herein, the term "similarity of an object" refers to the similarity of features used when an object is detected. Examples of the features include the shape, pattern, and color of the target object and the direction in which the target object in an image is observed. In addition, the term "dissimilar target object" refers to a target object to be detected that is not very similar to the target object in a training image.

Accordingly, when an image to be processed contains a dissimilar target object, the dissimilar target object is not detected, although the image contains the target object to be detected. Thus, detection error occurs.

Accordingly, the present invention provides a learning apparatus, a learning method, a recognition apparatus, a recognition method, and a program capable of reliably detecting a target object from an image.

According to an embodiment of the present invention, a learning apparatus includes feature extracting means for extracting a feature at a feature point in a plurality of training images including a training image that contains a target object to be recognized and a training image that does not contain the target object, tentative learner generating means for generating a tentative learner for detecting the target object in an image, where the tentative learner is formed from a plurality of weak learners through statistical learning using the training images and the feature obtained from the training images, and learner generating means for generating a final learner that is formed from a plurality of weak learners and that detects the target object in an image by substituting the feature into a feature function formed from at least one of the weak learners that form the tentative learner so as to obtain a new feature and performing statistical learning using the new feature and the training images.

The learner generating means can use, as the feature function, a linear sum of any number of the weak learners among the plurality of weak learners that form the tentative learner.

The learner generating means can generate any number of a plurality of the features using a plurality of the corresponding feature functions, and the number of the weak learners that form each of the feature functions can differ.

According to another embodiment of the present invention, a learning method or a program includes the steps of extracting a feature at a feature point in a plurality of training images including a training image that contains a target object to be recognized and a training image that does not contain the target object, generating a tentative learner for detecting the target object in an image, where the tentative learner is formed from a plurality of weak learners through statistical learning using the training images and the feature obtained from the training images, and generating a final learner that is formed from at least one of the weak learners and that detects the target object in an image by substituting the feature into a feature function formed from at least one of the weak learners that form the tentative learner so as to obtain a new feature and performing statistical learning using the new feature and the training images.

According to the learning apparatus, the learning method, and the program of the above-described embodiments, a feature at a feature point is extracted from a plurality of training images including a training image that contains a target object to be recognized and a training image that does not contain the target object. A tentative learner for detecting the target object in an image is generated, where the tentative learner is formed from a plurality of weak learners through statistical learning using the training images and the feature obtained from the training images, and a final learner that is formed from a plurality of weak learners and that detects the target object in an image is generated by substituting the feature into a feature function formed from at least one of the weak learners that form the tentative learner so as to obtain a new feature and performing statistical learning using the new feature and the training images.

According to still another embodiment of the present invention, a recognition apparatus includes feature extracting means for extracting a feature at a feature point in an input image and detecting means for detecting a target object to be recognized from the input image by substituting the feature into a learner for detecting the target object in an image and performing computation, where the learner is generated using a plurality of training images including a training image that contains the target object to be recognized and a training image that does not contain the target object. The learner is formed by generating a tentative learner that is formed from a plurality of weak learners and that detects the target object in an image through statistical learning using the training images and the feature at the feature point of the training images, and by performing statistical learning using the training images and a new feature obtained by substituting the feature obtained from the training images into a feature function formed from at least one of the weak learners that form the tentative learner.

According to yet still another embodiment of the present invention, a recognition method or a program includes the steps of extracting a feature at a feature point in an input image, detecting a target object from the input image by substituting the feature into a learner for detecting the target object to be recognized in an image, where the learner is generated using a plurality of training images including a training image that contains the target object to be recognized and a training image that does not contain the target object. The learner is formed by generating a tentative learner for detecting the target object from an image, where the tentative learner is formed from a plurality of weak learners through statistical learning using the training images and the feature at the feature point of the training images, and by performing statistical learning using the training images and a new feature obtained by substituting the feature obtained from the training images into a feature function formed from at least one of the weak learners of the tentative learner.

According to the recognition apparatus, the recognition method, and the program of the above-described embodiments, a feature at a feature point in an input image is extracted. A target object is detected from the input image by substituting the feature into a learner for detecting the target object to be recognized in an image, where the learner is generated using a plurality of training images including a training image that contains the target object to be recognized and a training image that does not contain the target object.

According to the learning apparatus, the learning method, and the program, a learner capable of reliably detecting a target object in an image can be provided.

According to the recognition apparatus, the recognition method, and the program, a target object in an image can be reliably detected.

BRIEF DESCRIPTION OF THE DRAWINGS

FIG. 7 is a diagram illustrating a clothing feature;

FIG. 19 is a block diagram of an exemplary configuration of a computer.

DESCRIPTION OF THE PREFERRED EMBODIMENTS

Various exemplary embodiments of the present invention are described below with reference to the accompanying drawings.

Figure 1:
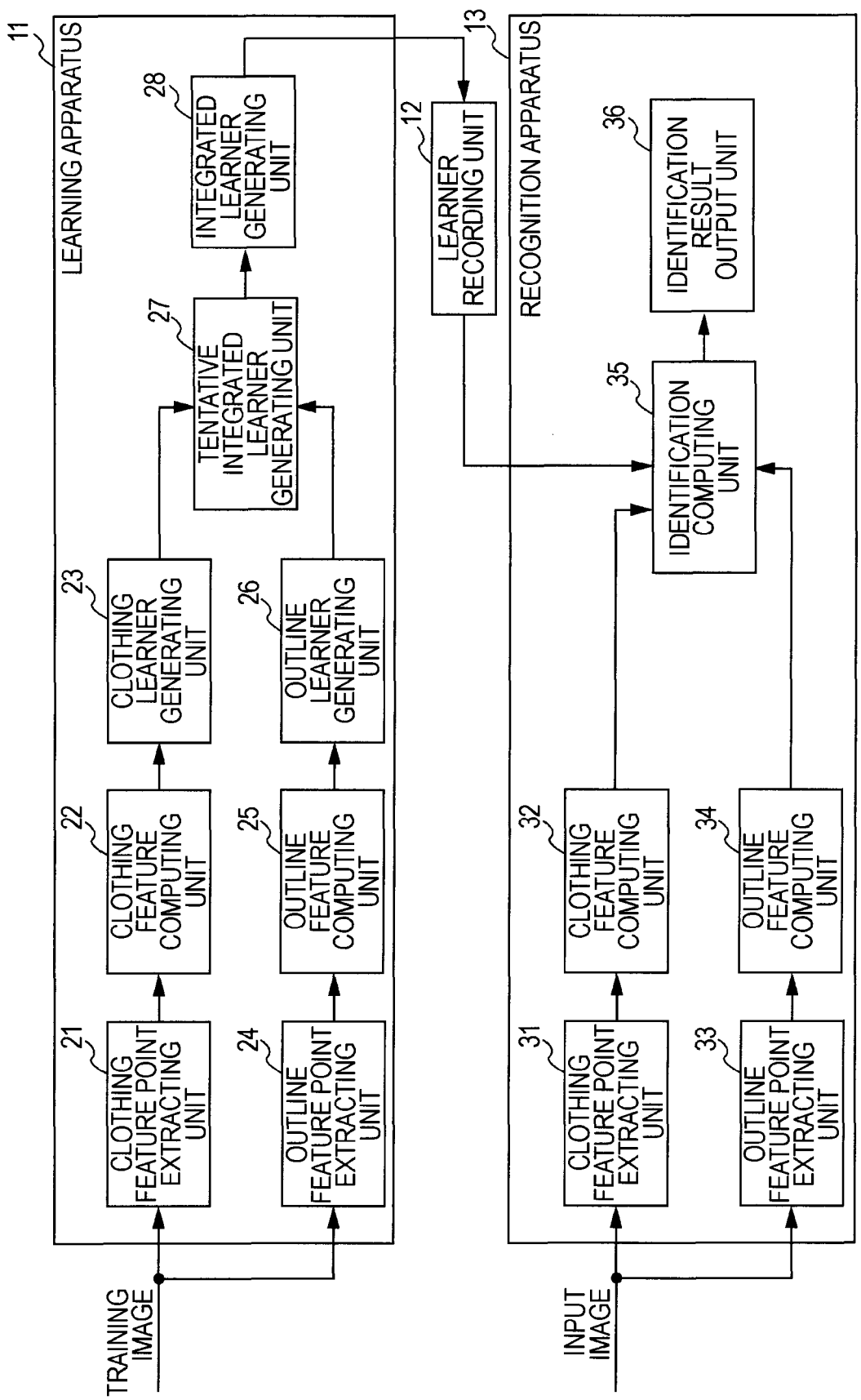
FIG. 1 is a block diagram of an exemplary configuration of a human recognition system according to an embodiment of the present invention.

FIG. 1 is a block diagram of an exemplary configuration of a human recognition system according to an embodiment of the present invention. The human recognition system detects (identifies), from an input image, an area of a human image that is a target object. The human recognition system includes a learning apparatus 11, a learner recording unit 12, and a recognition apparatus 13.

The learning apparatus 11 generates, using statistical learning (machine learning) based on input training images, a feature for identification and an integrated learner used by the recognition apparatus 13 when the recognition apparatus 13 identifies the presence of a target object image in an image. The learning apparatus 11 then instructs the learner recording unit 12 to store the generated feature for identification and integrated learner. The recognition apparatus 13 identifies the presence of a target image (a human image) in an input image using the feature for identification and the integrated learner stored in the learner recording unit 12. The recognition apparatus 13 then outputs the identification result.

The learning apparatus 11 includes a clothing feature point extracting unit 21, a clothing feature computing unit 22, a clothing learner generating unit 23, an outline feature point extracting unit 24, an outline feature computing unit 25, an outline learner generating unit 26, a tentative integrated learner generating unit 27, and an integrated learner generating unit 28.

The clothing feature point extracting unit 21 extracts, from an input training image, some of the pixels of the training image as clothing feature points that are used for generating a clothing learner. The clothing feature point extracting unit 21 then supplies the extracted clothing feature points and the training image to the clothing feature computing unit 22. The clothing learner is a relatively strong learner generated from a plurality of weak learner generated through statistical learning. The clothing learner is used for identifying whether a human image area is present in an input image using the features of the clothing worn by a person.

The clothing feature computing unit 22 creates pairs each including one of the clothing feature points received from the clothing feature point extracting unit 21 and another clothing feature point. In addition, the clothing feature computing unit 22 computes, using the training image received from the clothing feature point extracting unit 21, a clothing feature representing a distance between the textures of two areas including the clothing feature points for each of the pair. Subsequently, the clothing feature computing unit 22 supplies the obtained clothing feature and the training image to the clothing learner generating unit 23.

The clothing learner generating unit 23 performs a statistical learning process based on, for example, the AdaBoost method using the training image and the clothing feature supplied from the clothing feature computing unit 22 so as to generate a clothing learner that recognizes a person serving as a target object in the image. In addition, the clothing learner generating unit 23 supplies the training image, the clothing feature, and the generated clothing learner to the tentative integrated learner generating unit 27.

The outline feature point extracting unit 24 extracts, from the input training image, some of the pixels of the training image as outline feature points that are used for generating an outline learner. The outline feature point extracting unit 24 then supplies the extracted outline feature points and the training image to the outline feature computing unit 25. The outline learner is a relatively strong learner generated from a plurality of weak learner generated through statistical learning. The outline learner is used for identifying whether a human image area is present in an input image using the outline of the human image.

The outline feature computing unit 25 computes, using the training image received from the outline feature point extracting unit 24 and a filtering process using a steerable filter, an outline feature representing an extracted outline for each of the outline feature points. The outline feature computing unit 25 then supplies the obtained outline feature and the training image to the outline learner generating unit 26. The outline learner generating unit 26 performs a statistical learning process based on, for example, the AdaBoost method using the training image and the outline feature supplied from the outline feature computing unit 25 so as to generate an outline learner that recognizes a person serving as a target object in the image. In addition, the outline learner generating unit 26 supplies the training image, the outline feature, and the generated outline learner to the tentative integrated learner generating unit 27.

The tentative integrated learner generating unit 27 integrates the clothing learner received from the clothing learner generating unit 23 with the outline learner received from the outline learner generating unit 26 so as to generate a tentative integrated learner that are tentatively used. Subsequently, the tentative integrated learner generating unit 27 supplies the generated tentative integrated learner, the clothing feature, the outline feature, and the training image to the integrated learner generating unit 28.

The integrated learner generating unit 28 selects some of the weak learners that form the tentative integrated learner supplied from the tentative integrated learner generating unit 27, that is, some of the weak learners that form the clothing learner or the outline learner. The integrated learner generating unit 28 then generates a feature function that is a function formed from the selected weak learners. In addition, the integrated learner generating unit 28 substitutes the clothing feature or the outline feature supplied from the tentative integrated learner generating unit 27 into the generated feature function. Thereafter, the integrated learner generating unit 28 uses the resulting value as a new feature of the training image and performs a statistical learning process using, for example, the AdaBoost method so as to generate a final integrated learner.

Subsequently, the integrated learner generating unit 28 supplies the generated integrated learner to the learner recording unit 12. The learner recording unit 12 stores the integrated learner. In addition, the integrated learner generating unit 28 supplies the clothing feature of a pair of clothing feature points and the outline feature of the outline feature point used for recognizing the target object by using the integrated learner to the learner recording unit 12 as a feature for identification. The learner recording unit 12 stores the supplied clothing feature and outline feature. The feature for identification represents a clothing feature and an outline feature at the clothing feature point and the outline feature point corresponding to the weak learner that forms the integrated learner, respectively. By using the feature for identification, the feature points from which the feature to be substituted into each of the weak learners of the integrated learner is computed can be identified.

In addition, the recognition apparatus 13 includes a clothing feature point extracting unit 31, a clothing feature computing unit 32, an outline feature point extracting unit 33, an outline feature computing unit 34, an identification computing unit 35, and an identification result output unit 36. Note that the clothing feature point extracting unit 31 to the outline feature computing unit 34 of the recognition apparatus 13 perform, on an input image including the target object to be recognized, processing similar to that performed by the clothing feature point extracting unit 21, the clothing feature computing unit 22, the outline feature point extracting unit 24, and the outline feature computing unit 25 of the learning apparatus 11. Accordingly, the descriptions thereof are not repeated.

The identification computing unit 35 reads the feature for identification and the integrated learner stored in the learner recording unit 12. Thereafter, the identification computing unit 35 performs computation by substituting one of the clothing features received from the clothing feature computing unit 32 and the outline feature received from the outline feature computing unit 34 corresponding to the feature for identification into the readout integrated learner. The identification result output unit 36 acquires a computation result from the identification computing unit 35 and outputs, on the basis of the computation result, a recognition result indicating whether the target object is detected (recognized) in the input image.

An exemplary configuration of the outline feature computing unit 25 shown in FIG. 1 is described in more detail next with reference to FIG. 2. The outline feature computing unit 25 includes a first-order filter processing unit 61, a second-order filter processing unit 62, a third-order filter processing unit 63, and a feature generating unit 64. The training image received from the outline feature point extracting unit 24 is supplied to the four units from the first-order filter processing unit 61 through the feature generating unit 64. The outline feature points are supplied to the three units from the first-order filter processing unit 61 through the third-order filter processing unit 63.

The first-order filter processing unit 61 performs a filtering process on each of the supplied outline feature points using a first-order differential function $G_1$ of a Gauss function G so as to extract a feature. The first-order filter processing unit 61 then supplies the extracted feature to the feature generating unit 64. The Gauss function G and the first-order differential function $G_1$ are expressed as follows:

$$G = e^{-\frac{x^2+y^2}{2\sigma^2}} \quad (1)$$

$$G_1(\theta) = \cos(\theta)G_1(0°) + \sin(\theta)G_1(90°) \quad (2)$$

In equation (1), $\sigma$ denotes the Gauss width. In equation (2), $\theta$ denotes any angle, that is, the direction of a filter to be computed.

For example, the first-order filter processing unit 61 changes the Gauss width $\sigma$ of the gauss function G to one of three predetermined values (e.g., Gauss width $\sigma1$, $\sigma2$, $\sigma3=1$, 2, 4). Each time the Gauss width a is changed, equation (2) is computed for four predetermined directions (e.g., $\theta=\theta1$, $\theta2$, $\theta3$, $\theta4$). Note that the number of directions is not limited to four. For example, eight directions (e.g., eight directions obtained by equally dividing pi) may be used.

The second-order filter processing unit 62 performs a filtering process on each of the supplied outline feature points using a second-order differential function $G_2$ of the Gauss function G so as to extract a feature. The second-order filter processing unit 62 then supplies the extracted feature to the feature generating unit 64. The second-order differential function $G_2$ is expressed as follows:

$$G_2(\theta) = k_{21}(\theta)G_2(0°) + k_{22}(\theta)G_2(60°) + k_{23}(\theta)G_2(120°) \quad (3)$$

In equation (3), a coefficient $k_{2i}(\theta)$ (i=1, 2, 3) is a function expressed as follows:

$$k_{2i}(\theta) = \frac{1}{3}\{1 + 2\cos(2(\theta - \theta i))\} \quad (4)$$

For example, the second-order filter processing unit 62 changes the Gauss width σ of the gauss function G to one of three predetermined values (e.g., Gauss width σ1, σ2, σ3=1, 2, 4). Each time the Gauss width σ is changed, equation (3) is computed for four predetermined directions (e.g., θ=θ1, θ2, θ3, θ4).

The third-order filter processing unit 63 performs a filtering process on each of the supplied outline feature points using a third-order differential function $G_3$ of the Gauss function G so as to extract a feature. The third-order filter processing unit 63 then supplies the extracted feature to the feature generating unit 64. The third-order differential function $G_3$ is expressed as follows:

$$G_3(\theta) = k_{31}(\theta)G_3(0°) + k_{32}(\theta)G_3(45°) + k_{33}(\theta)G_3(90°) + k_{34}(\theta)G_3(135°) \quad (5)$$

where θ denotes any angle.

In equation (5), a coefficient $k_{3i}(\theta)$ (i=1, 2, 3, 4) is a function expressed as follows:

$$k_{3i}(\theta) = \frac{1}{4}\{2\cos(\theta - \theta i) + 2\cos(3(\theta - \theta i))\} \quad (6)$$

For example, the third-order filter processing unit 63 changes the Gauss width σ of the gauss function G to one of three predetermined values (e.g., Gauss width σ1, σ2, σ3=1, 2, 4). Each time the Gauss width σ is changed, equation (5) is computed for four predetermined directions (e.g., θ=θ1, θ2, θ3, θ4).

The feature generating unit 64 receives the features of the outline feature points computed for four directions θ of each of three Gauss widths supplied from each of the first-order filter processing unit 61, the second-order filter processing unit 62, and the third-order filter processing unit 63. The feature generating unit 64 then arranges the 36 features (3 (orders)×4 (directions)×3 (Gauss widths)). This arrangement serves as the outline features of the outline feature points. In addition, the feature generating unit 64 supplies the generated outline features and the received training image to the outline learner generating unit 26.

As described above, the outline feature computing unit 25 extracts the features (the outline) that are different for each of the differential orders using the direction and the frequency obtained by differentiating the Gauss function, that is, by using a filter (a base function) having selectivity for the direction θ and the Gauss width σ. The features serve as an outline feature. When steerable filters are used for extracting an outline feature and if the filters have different directions θ and the Gauss widths σ, a filter for any direction θ, that is, a differential function $G_n$ (n=1, 2, 3) of the Gauss function G can be expressed as a linear combination of the filters.

Figure 3:
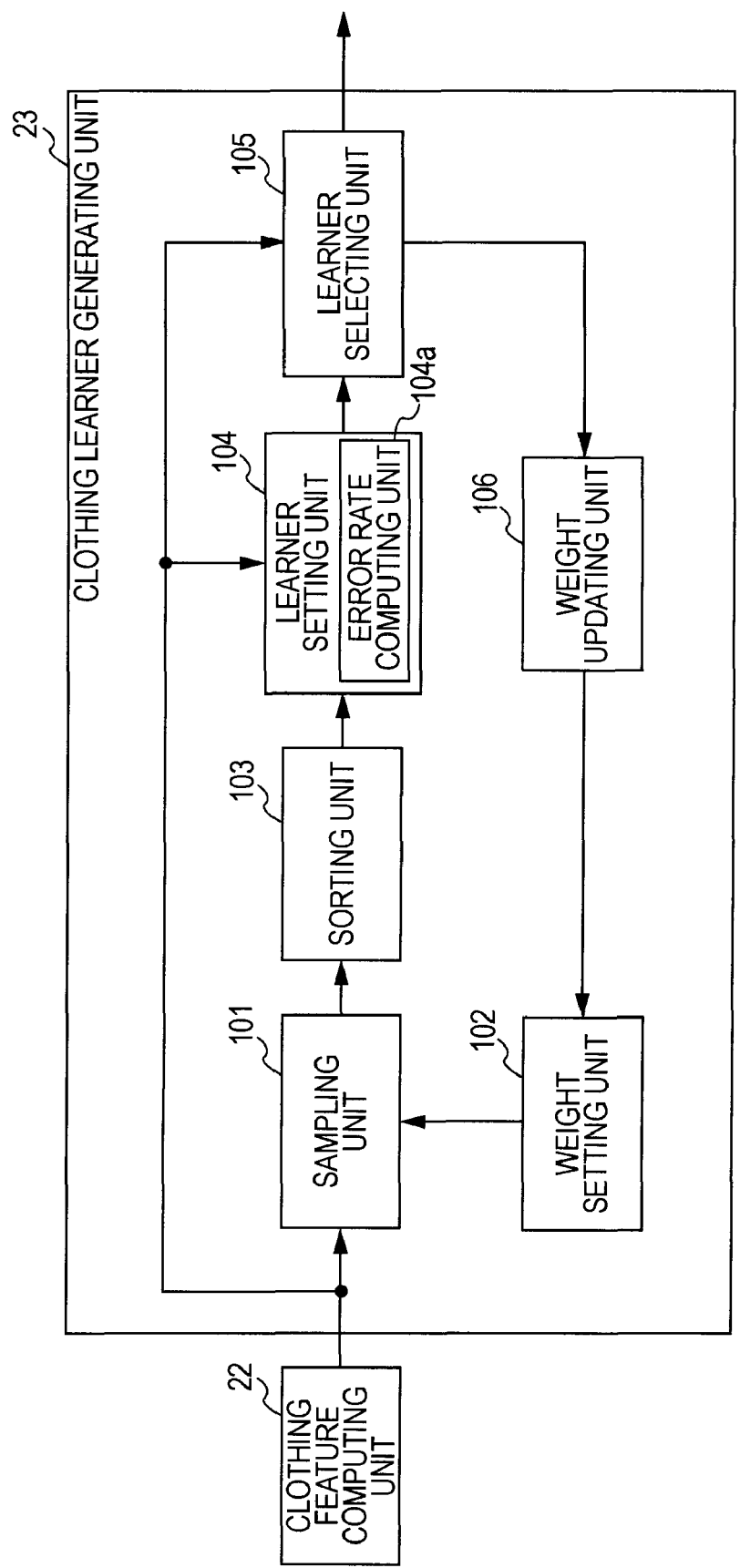
FIG. 3 is a block diagram illustrating an exemplary configuration of a clothing learner generating unit in detail.

FIG. 3 is a more detailed block diagram of an exemplary configuration of the clothing learner generating unit 23 shown in FIG. 1. The clothing learner generating unit 23 includes a sampling unit 101, a weight setting unit 102, a sorting unit 103, a learner setting unit 104, a learner selecting unit 105, and a weight updating unit 106. In the clothing learner generating unit 23, the clothing feature and the training image received from the clothing feature computing unit 22 are supplied to the sampling unit 101, the learner setting unit 104, and the learner selecting unit 105.

For each of the pairs of clothing feature points, the sampling unit 101 samples M clothing features from among the clothing features in a plurality of training images at the same clothing feature points in accordance with the weights assigned to the training images and set by the weight setting unit 102. The sampling unit 101 then supplies the M clothing features to the sorting unit 103.

The sorting unit 103 sorts the M sample clothing features for each of the pairs in ascending order or descending order. The sorting unit 103 then supplies the sorted clothing features to the learner setting unit 104.

The learner setting unit 104 controls an error rate computing unit 104a so as to compute the error rate for each of the clothing features of each pair sorted in ascending order or descending order by changing a threshold value on the basis of true-false information indicating whether the target object to be recognized is included in the training image from which the clothing feature is extracted. In this way, the learner setting unit 104 determines the threshold value so that the error rate is minimized. That is, this threshold value is set as a weak learner. In addition, the learner setting unit 104 supplies the error rate for each of the weak learners to the learner selecting unit 105.

More specifically, a training image has true-false information (a label) indicating whether the target object to be recognized is included in the training image. The learner setting unit 104 sets the weak learner on the basis of the true-false information attached to the training image supplied from the clothing feature computing unit 22.

The learner selecting unit 105 selects the weak learner having a minimum error rate from among the set weak learners. Thereafter, the learner selecting unit 105 updates a clothing learner formed from the weak learners and supplies the training image, a final clothing learner, and the clothing features corresponding to the weak learners that form the clothing learner to the tentative integrated learner generating unit 27. In addition, the learner selecting unit 105 computes the reliability of the selected weak learner on the basis of the error rate of the weak learner and supplies the reliability to the weight updating unit 106.

The weight updating unit 106 recomputes the weight assigned to each of the training images on the basis of the supplied reliability and updates the weights by normalizing the weights. Thereafter, the weight updating unit 106 supplies the update weights to the weight setting unit 102. The weight setting unit 102 determines the weight for each of the training images on the basis of the update weights supplied from the weight updating unit 106.

Figure 2:
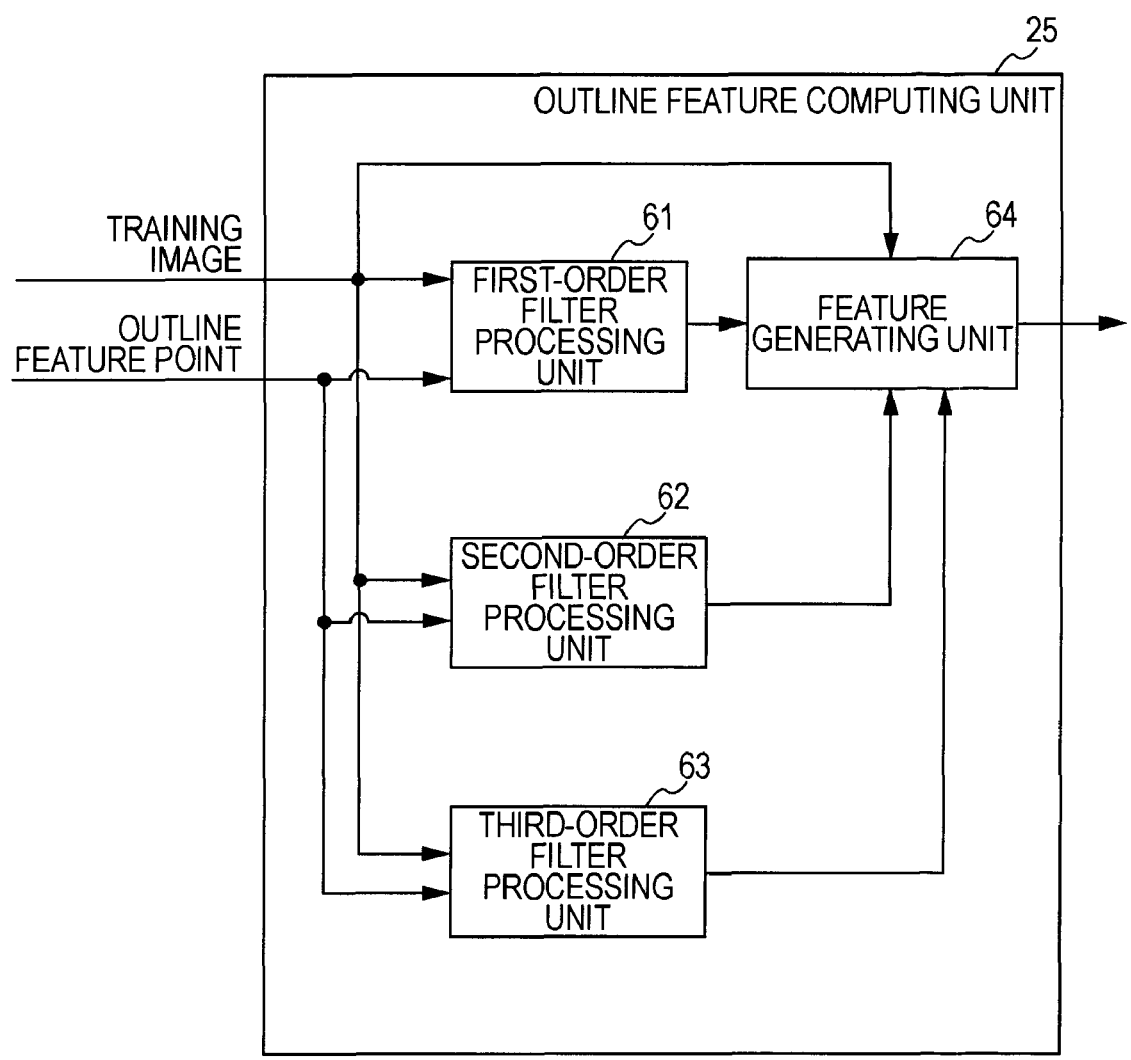
FIG. 2 is a block diagram illustrating an exemplary configuration of an outline feature computing unit in detail.

Note that the outline feature computing unit 34 shown in FIG. 1 has a configuration similar to that of the outline feature computing unit 25 shown in FIG. 2. In addition, the outline learner generating unit 26 shown in FIG. 1 has a configuration similar to that of the clothing learner generating unit 23 shown in FIG. 3. Accordingly, the illustrations and descriptions of the configurations of the outline feature computing unit 34 and the outline learner generating unit 26 are not repeated.

Figure 4:
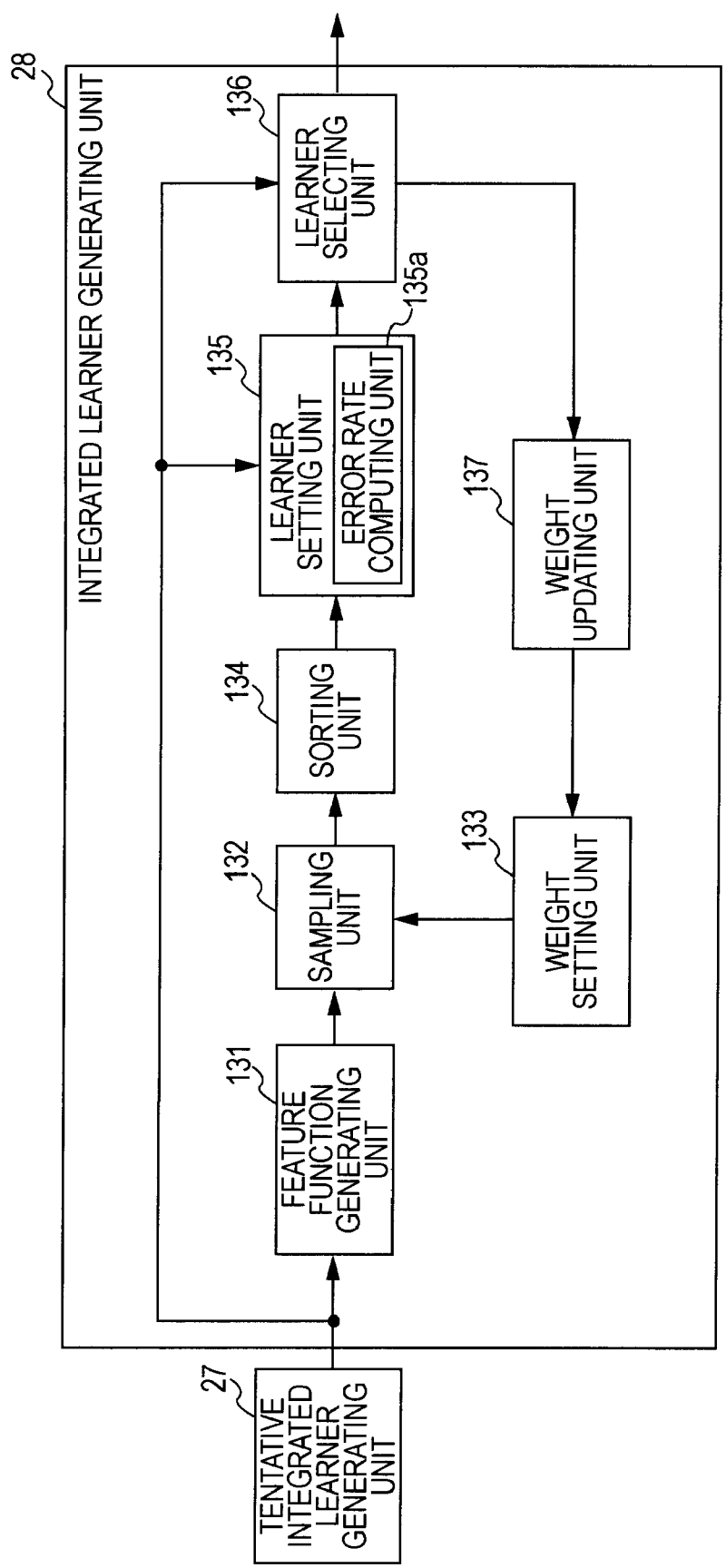
FIG. 4 is a block diagram illustrating an exemplary configuration of an integrated learner generating unit in detail.

FIG. 4 illustrates an exemplary configuration of the integrated learner generating unit 28 shown in FIG. 1 in more detail. That is, the integrated learner generating unit 28 includes a feature function generating unit 131, a sampling unit 132, a weight setting unit 133, a sorting unit 134, a learner setting unit 135, a learner selecting unit 136, and a weight updating unit 137. Note that the sampling unit 132 and the weight updating unit 137 have configurations similar to those of the sampling unit 101 and the weight updating unit 106 shown in FIG. 3, respectively. Accordingly, the descriptions thereof are not repeated.

The feature function generating unit 131 generates any number of feature functions (e.g., P feature functions, where P is a natural number) on the basis of the tentative integrated learner supplied from the tentative integrated learner generating unit 27. Thereafter, the feature function generating unit 131 substitutes a corresponding clothing feature or outline feature into a weak learner that forms the generated feature function and defines the obtained value as a new feature. Subsequently, the feature function generating unit 131 supplies the training images received from the tentative integrated learner generating unit 27 and the new feature obtained for each of the feature functions for each of the training images to the sampling unit 132.

The units from the sampling unit 132 to the learner selecting unit 136 perform a statistical learning process using the new features generated by the feature function generating unit 131 and the training images and generate a final integrated learner. The generated integrated learner and the clothing feature and outline feature serving as the features for identification are supplied to the learner recording unit 12 and are stored.

When a training image is input to the learning apparatus 11 and the learning apparatus 11 is instructed to generate an integrated learner, the learning apparatus 11 starts a learning process and generates the integrated learner through statistical learning. The learning process performed by the learning apparatus 11 is described below with reference to a flowchart shown in FIG. 5.

In step S11, the clothing feature point extracting unit 21 extracts clothing feature points from an input training image. The clothing feature point extracting unit 21 then supplies the extracted clothing feature points and the training image to the clothing feature computing unit 22.

In step S12, the clothing feature computing unit 22 creates a pair of clothing feature points for each of the clothing feature points on the basis of the clothing feature points and the training image supplied from the clothing feature point extracting unit 21.

In step S13, the clothing feature computing unit 22 computes a clothing feature for each of the pairs of feature points. Thereafter, the clothing feature computing unit 22 supplies the obtained clothing feature and the training image to the clothing learner generating unit 23.

Figure 6:
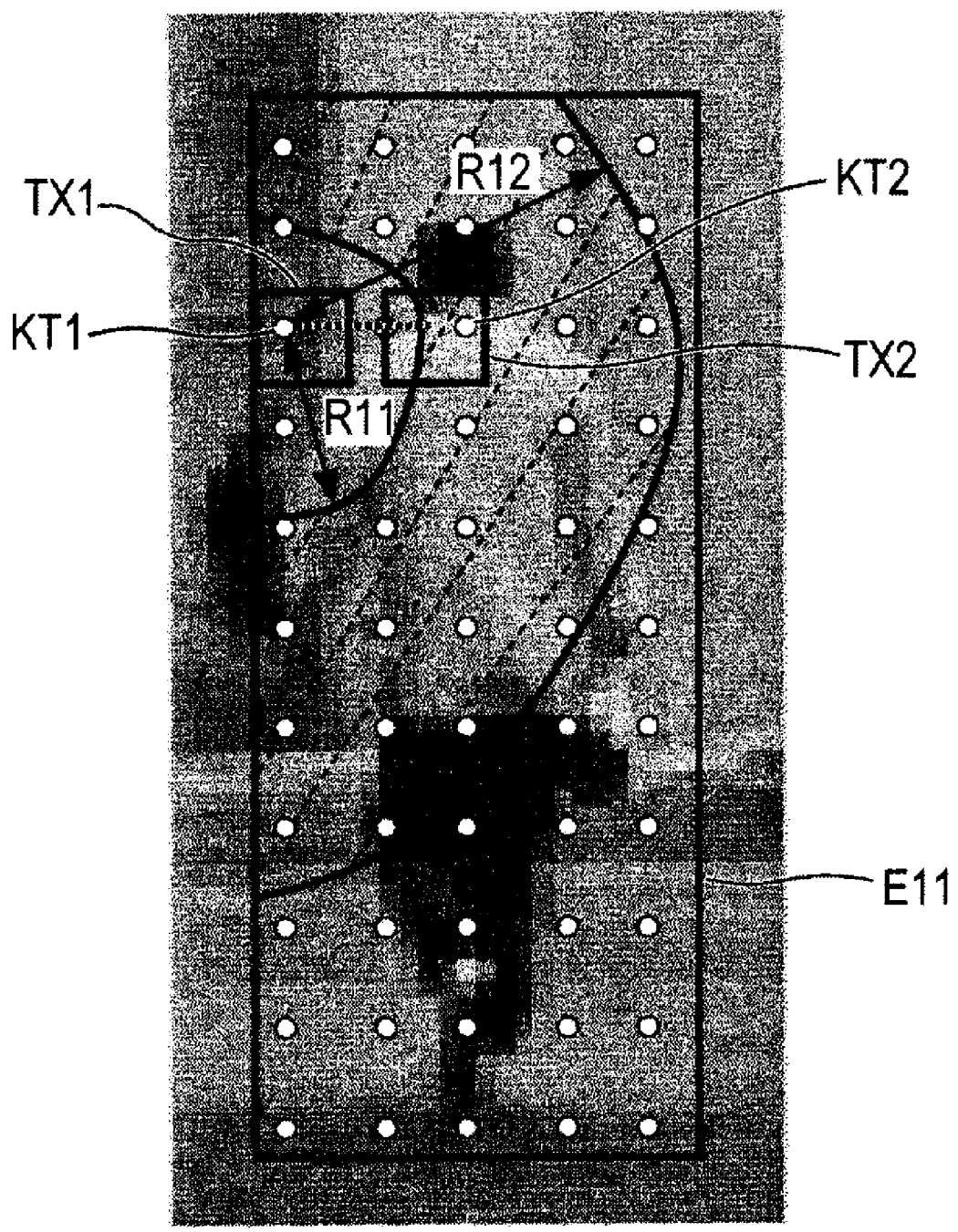
FIG. 6 is a diagram illustrating extraction of a clothing feature point.

For example, when a training image shown in FIG. 6 is input to the clothing feature point extracting unit 21, the clothing feature point extracting unit 21 extracts clothing feature points from the training image on the basis of a predetermined margin and the number of sampling skips (described below). In FIG. 6, circles in the training image represent pixels defined as clothing feature points.

As used herein, the term "margin" refers to the number of pixels from the end of the training image to an area from which feature points are to be extracted. The term "number of sampling skips" refers to a distance between pixels serving as clothing feature points in the training image.

Accordingly, for example, let the margin be 5 pixels, and let the number of sampling skips be 5 pixels. Then, the clothing feature point extracting unit 21 excludes an area formed from pixels within 5 pixels from the end of the training image and considers a remaining area E11 as a target area from which clothing feature points are to be extracted. Thereafter, the clothing feature point extracting unit 21 extracts, from among pixels in the area E11, the pixels each having a distance of 5 pixels from the neighboring pixels and defines the extracted pixels as clothing feature points. That is, in FIG. 6, the distance between the clothing feature points is 5 pixels in the vertical direction and the horizontal direction, and the feature points are pixels in the area E11.

Subsequently, the clothing feature computing unit 22 produces pairs of clothing feature points on the basis of a predetermined minimum radius and a predetermined maximum radius. For example, let R11 denote the minimum radius, and let R12 denote the maximum radius. Then, for a predetermined clothing feature point KT1, the clothing feature computing unit 22 produces pairs each including the clothing feature point KT1 and one of all of the clothing feature points located in an area having a radius greater than or equal to the minimum radius R11 and less than the maximum radius R12 from the clothing feature point KT1.

Accordingly, for example, if N clothing feature points are located in an area having a radius greater than or equal to the minimum radius R11 and less than the maximum radius R12 from the clothing feature point KT1, N pairs of clothing feature points are produced for the clothing feature point KT1. The clothing feature computing unit 22 produces pairs for each of all of the clothing feature points in this manner.

In addition, the clothing feature computing unit 22 computes the distance between the textures of areas having predetermined shapes and sizes, the centers of the areas being the clothing feature points that form a pair. Thereafter, the clothing feature computing unit 22 defines the distance as a clothing feature.

For example, when the clothing feature for a pair including the clothing feature point KT1 and the clothing feature point KT2 (refer to FIG. 6) is computed using an SSD (sum of square distance) method, the clothing feature computing unit 22 defines a predetermined area the center of which is the clothing feature point KT1 as an area TX1. In addition, the clothing feature computing unit 22 defines a predetermined area the center of which is the clothing feature point KT2 and having a size the same as that of the area TX1 as an area TX2. The clothing feature computing unit 22 then computes the sum of squares of a difference between the pixel value of a pixel in the area TX1 and the pixel value of a pixel in the area TX1 corresponding to the pixel in the area TX1. Subsequently, the clothing feature computing unit 22 defines the sum of squares of difference as a clothing feature.

While the present embodiment has been described with reference to the SSD method, an SAD (sum of absolute distance) or normalized correlation may be employed.

In this way, the clothing feature computing unit 22 computes a clothing feature for each of the pairs of clothing feature points extracted from the training image. More specifically, several training images that contain the target object and several training images that do not contain the target object are input to the learning apparatus 11. Thereafter, extraction of clothing feature points and computation of the clothing feature are performed for each of the input training images.

Accordingly, for example, when M training images $PI_1$ to $PI_M$ (where M is a natural number) are input to the learning apparatus 11, the clothing feature of each of the pairs of clothing feature points can be obtained for each of the M training images $PI_i$ ($1 \leq i \leq M$), as shown in FIG. 7.

In FIG. 7, a square represents the clothing feature of a pair of clothing feature points. In addition, a series of squares arranged in the vertical direction represents a series of the clothing features obtained from one of the training images $PI_i$ ($1 \leq i \leq M$). The series of squares arranged in the vertical direction includes the clothing features equal, in number, to the number of pairs of clothing feature points obtained from the training image $PI_i$. That is, the number of pairs of clothing feature points obtained from one of the training images $PI_i$ is equal to the number of dimensions of the clothing feature (a vector including the clothing features serving as elements) of the training image $PI_i$.

In addition, in FIG. 7, a label (true-false information) is shown beneath the series of squares arranged in the vertical direction. The label indicates whether the target object is included in the training image $PI_i$. For example, the label "+1" shown beneath the series of clothing features of the training image $PI_1$ indicates that the target object is included in the training image $PI_1$. In contrast, the label "−1" shown beneath the series of clothing features of the training image $PI_M$ indicates that the target object is not included in the training image $PI_M$.

Referring back to FIG. 5, after the clothing feature is obtained in step S13, the processing proceeds to step S14, where the clothing learner generating unit 23 performs a clothing learner generating process so as to generate a clothing learner. Thereafter, the clothing learner generating unit 23 supplies the clothing learner, the training image, and the generated clothing learner to the tentative integrated learner generating unit 27. The clothing learner generating process is described in more detail below.

In step S15, the outline feature point extracting unit 24 extracts outline feature points from the input training image and supplies the training image and the extracted outline feature points to the outline feature computing unit 25.

Figure 8A:
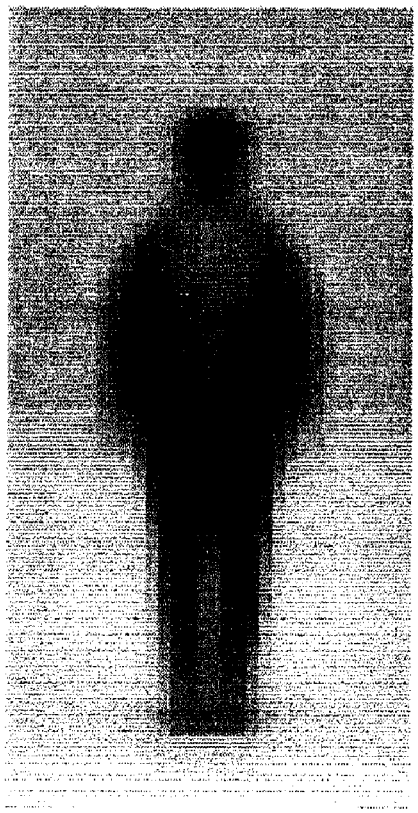
FIGS. 8A and 8B are diagrams illustrating extraction of an outline feature point.
Figure 8B:
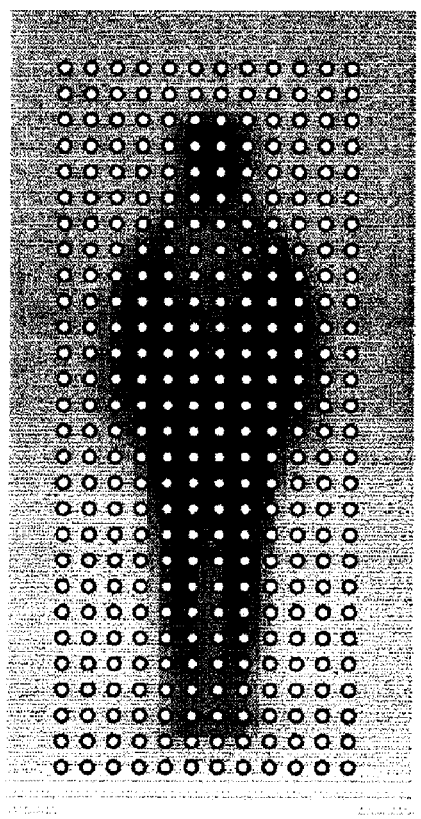

For example, as shown in FIG. 8B, when a training image shown in FIG. 8A is input to the outline feature point extracting unit 24, the outline feature point extracting unit 24 extracts pixels arranged in the training image at predetermined intervals as outline feature points. Note that, in FIG. 8B, circles in the training image represent pixels selected as the outline feature points.

The training image shown in FIGS. 8A and 8B has 32 pixels in the horizontal direction and 64 pixels in the vertical direction. The outline feature point extracting unit 24 selects, from among the pixels in the training image, one pixel for every two pixels in the horizontal direction and the vertical direction as outline feature points. Thus, in FIGS. 8A and 8B, 12 pixels in the horizontal direction and 28 pixels in the vertical direction, totaling 336 (=12×28) pixels, are selected as outline feature points.

In step S16, the outline feature computing unit 25 performs an outline feature computing process in which the outline feature of each of the outline feature points is computed on the basis of the outline feature points and the training image supplied from the outline feature point extracting unit 24. The obtained outline feature and the training image are supplied from the outline feature computing unit 25 to the outline learner generating unit 26. The outline feature computing process is described in more detail below.

In step S17, the outline learner generating unit 26 performs an outline learner generating process on the basis of the training image and the outline feature supplied from the outline feature computing unit 25 so as to generate an outline learner. Note that, in the outline learner generating process, processing similar to the clothing learner generating process is performed.

In step S18, the tentative integrated learner generating unit 27 integrates the clothing learner supplied from the clothing learner generating unit 23 with the outline learner supplied from the outline learner generating unit 26 so as to generate a tentative integrated learner.

For example, a learner obtained using the AdaBoost method can be expressed as a linear combination of weak learners. Accordingly, the tentative integrated learner generating unit 27 integrates the clothing learner with the outline learner using a Late Fusion method.

That is, in order to obtain a tentative integrated learner U(x), the tentative integrated learner generating unit 27 performs a linear combination of a clothing learner R(x) and an outline learner T(x) by computing the following equation:

$$U(x) = \alpha \cdot R(x) + \beta \cdot T(x) \qquad (7)$$

In equation (7), $\alpha$ and $\beta$ denote predetermined coefficients, that is, tuning parameters. For example, $\alpha$ and $\beta$ can be determined by the identification rate for a training image used for a statistical learning process.

After the tentative integrated learner generating unit 27 generates the tentative integrated learner, the tentative integrated learner generating unit 27 supplies the tentative integrated learner, the clothing feature, the outline feature, and the training image to the integrated learner generating unit 28.

In step S19, the integrated learner generating unit 28 generates an integrated learner by performing an integrated learner generation process using the tentative integrated learner, the clothing feature, the outline feature, and the training image supplied from the tentative integrated learner generating unit 27. Thereafter, the integrated learner generating unit 28 supplies the generated integrated learner and the clothing feature and outline feature serving as the features for recognition to the learner recording unit 12. The learner recording unit 12 stores the received integrated learner, the clothing feature, and the outline feature. Subsequently, the learning process is completed. The integrated learner generation process is described in more detail below.

In this way, the learning apparatus 11 obtains the clothing feature of each of the pair of clothing feature points so as to generate the clothing learner. In addition, the learning apparatus 11 obtains the outline feature so as to generate the outline learner. Thereafter, the learning apparatus 11 integrates the clothing learner with the outline learner using a linear combination so as to generate a tentative integrated learner. Subsequently, the learning apparatus 11 defines a feature obtained through the tentative integrated learner as a new feature and generates a final integrated learner.

By integrating the clothing learner with the outline learner so as to generate the tentative integrated learner in this manner, the integrated learner that can more reliably detect the target object in an image can be provided. That is, the tentative integrated learner is generated by integrating the clothing learner that uses the feature of the clothing of the target object with the outline learner that uses the outline of the target object. Accordingly, if at least one of the two features can be sufficiently detected, the target object can be detected from the image.

More specifically, in the learning apparatus 11, a clothing feature that does not vary in accordance with a change in the pattern of an item of clothing of a person is used to detect the person in an image. This clothing feature is a newly defined feature using a statistical fact that a person wears an item of clothing (a shirt) having a repeating pattern of the same texture on the upper body and an item of clothing (pants) having a repeating pattern of the same texture on the lower body.

That is, the clothing feature indicates the similarity between the textures in any two areas in an image, that is, the similarity between two luminance patterns. For example, the similarity between the textures of two areas in the upper half of a person is high. However, the similarity between the textures of areas in the upper body and the lower body is low. In addition, the similarity between the textures of an item of clothing that a person wears and the background is low. In the learning apparatus 11, the clothing learner that detects a human image from an image using such similarity between the textures of two areas is generated and is used for generating the integrated learner.

Accordingly, for example, even when the outline is not sufficiently extracted from the input image, a human image can be detected from the image by using the integrated learner if the feature of the similarity between the textures of two areas can be sufficiently extracted from the image. In contrast, if, in an image, an item of clothing that a person wears has a non-repeating pattern or if an item of clothing is partially hidden by, for example, a bag, the feature of the similarity between the textures of two areas is not likely to be sufficiently extracted. However, if the outline can be sufficiently extracted, the human image can be extracted from the image by using the integrated learner.

Furthermore, in the learning apparatus 11, by defining a new value obtained by substituting the clothing feature or the outline feature into the feature function obtained from the tentative integrated learner as a new feature and generating a final integrated learner, over-fitting can be prevented.

That is, if, in particular, the number of training images serving as samples for statistical learning is small, over-fitting frequently occurs. However, by using a value obtained from the feature function as a new feature and using a plurality of features in the statistical learning, some type of noise can be introduced into the learning process. Thus, over-fitting rarely occurs. Accordingly, when statistical learning using any number of newly defined features is performed, a target object that is not very similar to the target object contained in the training image serving as a sample can be detected in addition to a target that is similar to the target object contained in the training image. As a result, an integrated learner having high identification accuracy can be provided.

In addition, if the feature function is generated by combining any number of weak learners that form a tentative integrated learner, any number of new features can be obtained. Accordingly, a sparse space can be created in accordance with a recognition task and, therefore, a problem can be easily solved.

Figure 5:
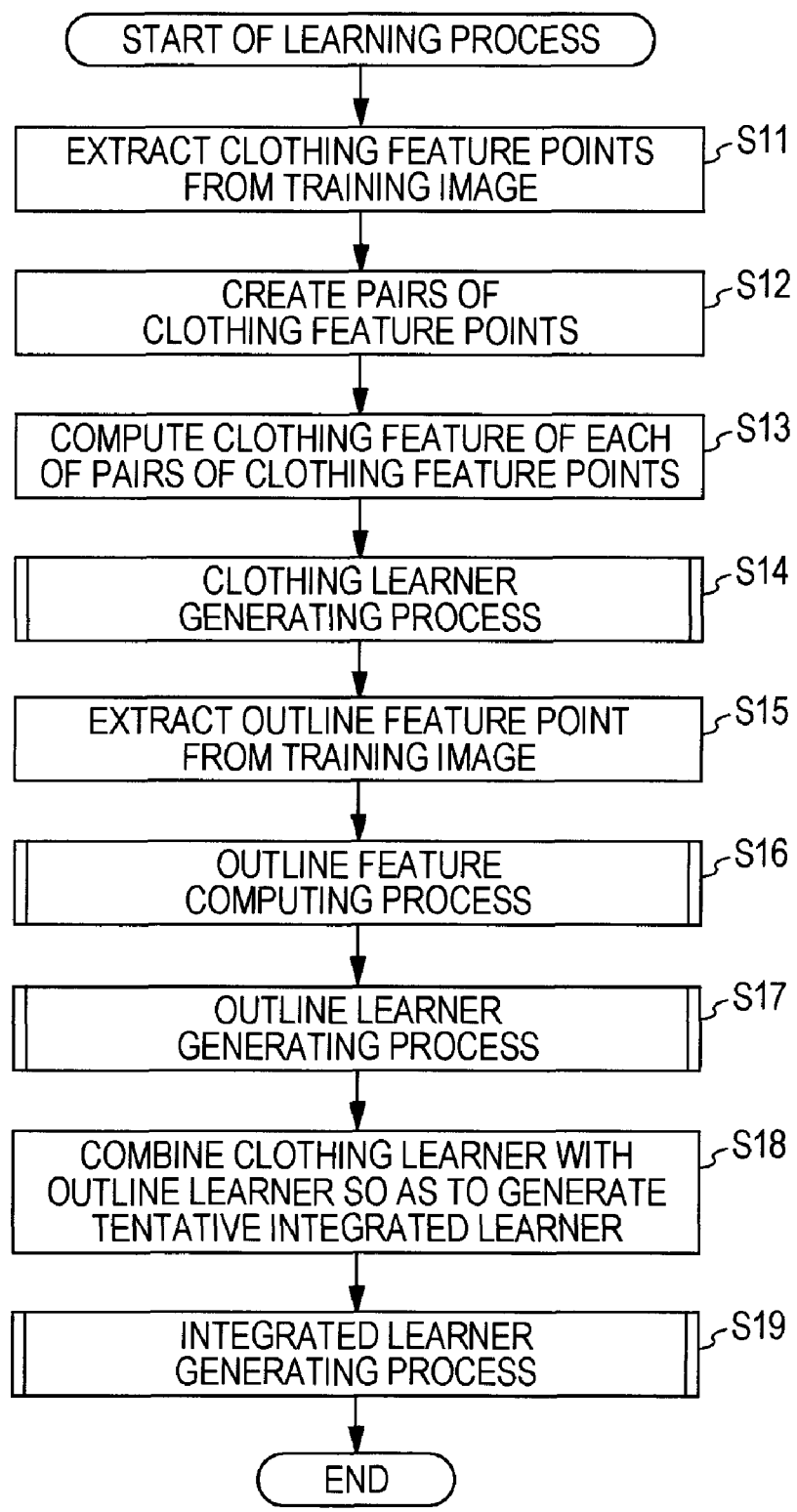
FIG. 5 is a flowchart of an exemplary learning process.
Figure 9:
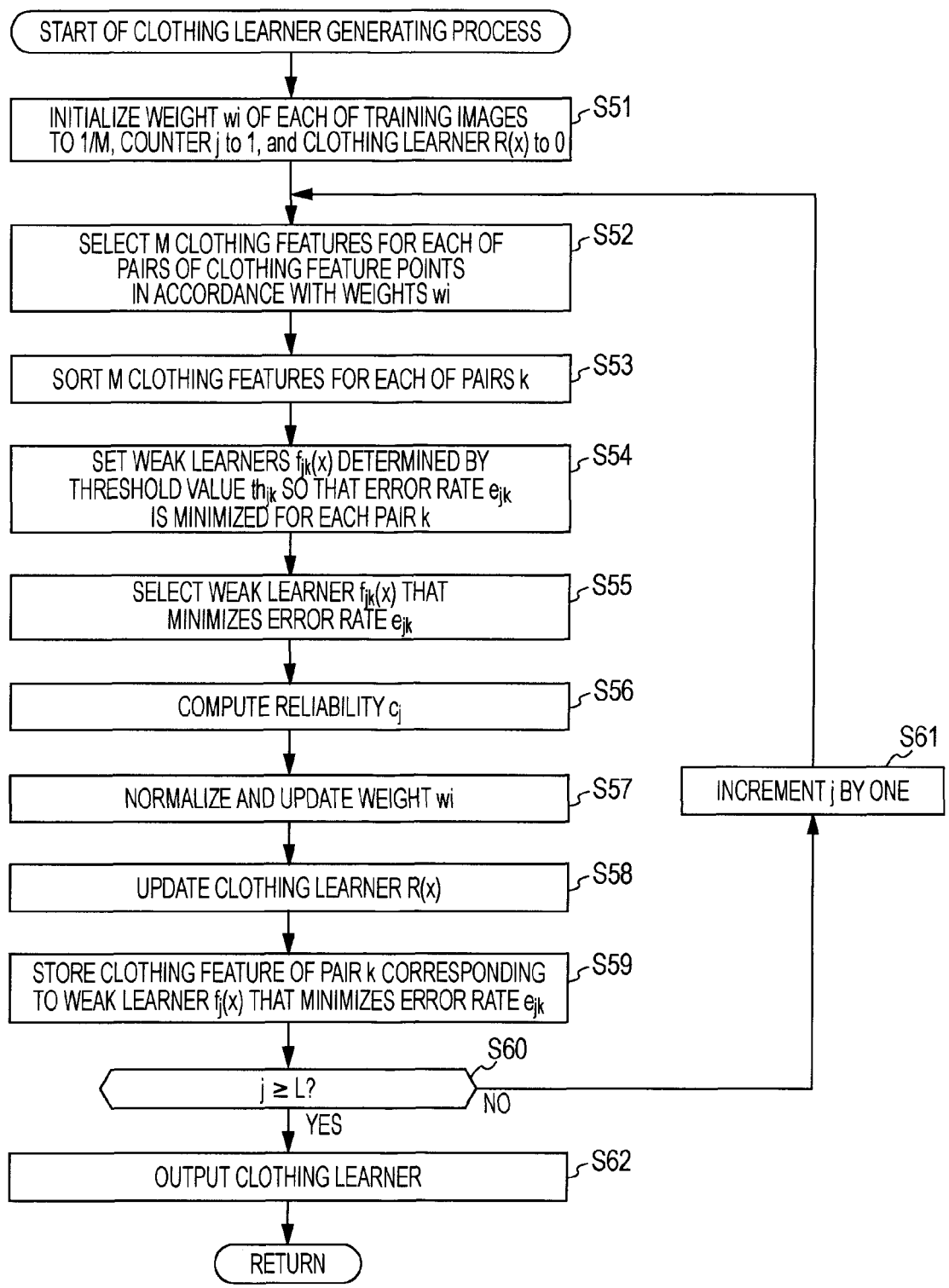
FIG. 9 is a flowchart of an exemplary clothing learner generating process.

A clothing learner generating process corresponding to the process performed in step S14 shown in FIG. 5 is described next with reference to the flowchart shown in FIG. 9.

In step S51, the weight setting unit 102 initializes a weight $W_i$ of the training image $PI_i$ ($1 \leq i \leq M$) (see FIG. 7) to 1/M. The learner selecting unit 105 initializes a counter j to 1. The learner selecting unit 105 further initializes the clothing learner R(x) formed from the sum of the weak learners to 0.

Here, i serves as an identifier of the training image $PI_i$ shown in FIG. 7, and $1 \leq i \leq M$. Through the processing performed in step S51, the weights $W_i$ of all of the training images $PI_i$ are set to the same normalized weight (=1/M). In addition, the counter j contains the predetermined number of updates of the clothing learner R(x).

In step S52, the sampling unit 101 selects M clothing features for each of the pairs of clothing feature points from among the clothing features of the pair of clothing feature points in the plurality of training images $PI_i$ at the same points, in accordance with the weights $W_i$ of the training images $PI_i$. The sampling unit 101 then supplies the M clothing features to the sorting unit 103.

Figure 10:
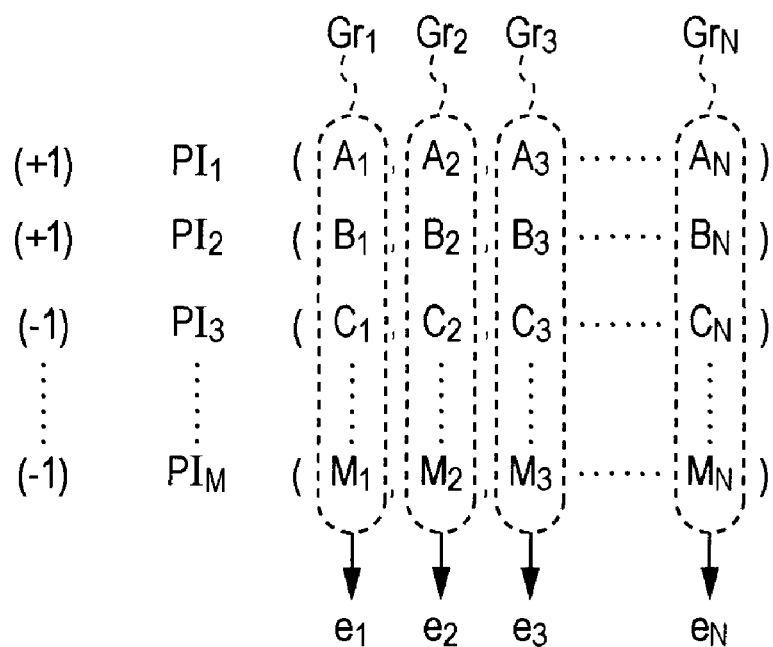
FIG. 10 is a diagram illustrating a sampling operation of a clothing feature for each of pairs of feature points.

For example, suppose that, as shown in FIG. 10, M clothing features in the training images $PI_1$ to $PI_M$ are supplied from the clothing feature computing unit 22 to the sampling unit 101. In FIG. 10, the clothing features acquired from the training images $PI_i$ ($1 \leq i \leq M$) are arranged in the horizontal direction. The number "+1" or "−1" attached to the left of the symbol $PI_i$ represents a label (true-false information) attached to the training image $PI_i$.

That is, in FIG. 10, the top row ($A_1, A_2, A_3, \ldots, A_N$) represents the clothing features of the pairs of clothing feature points in the training image $PI_1$. The number "+1" attached to the left of the symbol "$PI_1$" that indicates the training image $PI_1$ represents a label indicating that the image of a target object is contained in the training image $PI_1$.

In addition, the third row from the top ($C_1, C_2, C_3, \ldots, C_N$) represents the clothing features of the pairs of clothing feature points in the training image $PI_3$. The number "−1" attached to the left of the symbol "$PI_3$" represents a label indicating that the image of the target object is not contained in the training image $PI_3$.

As described above, in the example shown in FIG. 10, the clothing features of the N pairs of clothing feature points can be obtained from each of the training images $PI_i$. Furthermore, in FIG. 10, M clothing features $A_k$ to $M_k$ ($1 \leq k \leq N$) arranged in the vertical direction form a group $Gr_k$. The clothing features contained in the group $Gr_k$ are clothing features of a pair of clothing feature points in the training images $PI_i$ at the same points.

For example, a group $Gr_1$ includes the clothing features $A_1$ to $M_1$ arranged in the vertical direction. A pair of clothing feature points in the training image $PI_1$ from which the clothing feature $A_1$ is computed is located at the same position as that of another pair of clothing feature points in the group $Gr_1$, for example, a pair of clothing feature points in the training images $PI_M$ from which the clothing feature $M_1$ is computed. Hereinafter, pairs of clothing feature points from which clothing features are computed and that are located in the training images $PI_i$ and that belong to a group $Gr_k$ ($1 \leq k \leq N$) are referred to as "pairs k".

When the clothing features of the training images $PI_i$ as shown in FIG. 10 are supplied to the sampling unit 101, the sampling unit 101 selects, from among the clothing features of each of pairs K, that is, each of the groups $Gr_k$, M clothing features in accordance with the weights $W_i$. For example, the sampling unit 101 selects, from among the clothing features $A_1$ to $M_1$ in the group $Gr_1$, M clothing features in accordance with the weights $W_i$. Note that, in the first processing, all of the weights $W_i$ is 1/M. Accordingly, when M clothing features are selected, all of the clothing features are stochastically selected. Therefore, according to the present embodiment, in the first processing, all of the clothing features are selected for each of the groups $Gr_k$. However, in practice, the same clothing feature may be selected in duplicate.

Note that the weight $W_i$ can be used for error computation for each of the pairs of clothing feature points. In such a case, the error computation is performed by multiplying an error value by a data weight coefficient (the weight $W_i$).

In step S53, for each of the N groups $Gr_k$, the sorting unit 103 sorts the M clothing features selected for the group $Gr_k$, that is, the pair k in ascending order or descending order.

Thereafter, the sorting unit 103 supplies the sorted M clothing features to the learner setting unit 104. For example, the M clothing features selected from among the clothing features in the group $Gr_1$ shown in FIG. 10 are sorted.

In step S54, the learner setting unit 104 controls the error rate computing unit 104a so that the error rate computing unit 104a computes an error rate $e_{jk}$ while changing the threshold value for each of the groups $Gr_k$, that is, for each of the pairs k of clothing feature points on the basis of the true-false information (the label) attached to the training image supplied from the clothing feature computing unit 22. In this way, the threshold value is determined so that the error rate $e_{jk}$ is minimized.

Here, a threshold value $th_{jk}$ for each of the pairs k functions as a weak learner $f_{jk}(x)$. The learner setting unit 104 supplies the error rates $e_{jk}$ of the weak learners $f_{jk}(x)$ to the learner selecting unit 105. That is, each of N weak learners $f_{jk}(X)$ is set for the corresponding one of the N pairs k, and the error rate $e_{jk}$ is computed for each of the N weak learners $f_{jk}(x)$.

Note that the weak learner $f_{jk}(x)$ is a function that outputs a predetermined value $(a_{jk}+b_{jk})$ if the image of a target object is contained in an area of the feature point of an image to be recognized and that outputs a predetermined value $b_{jk}$ if the image of the target object is not contained in the area.

Figure 11:
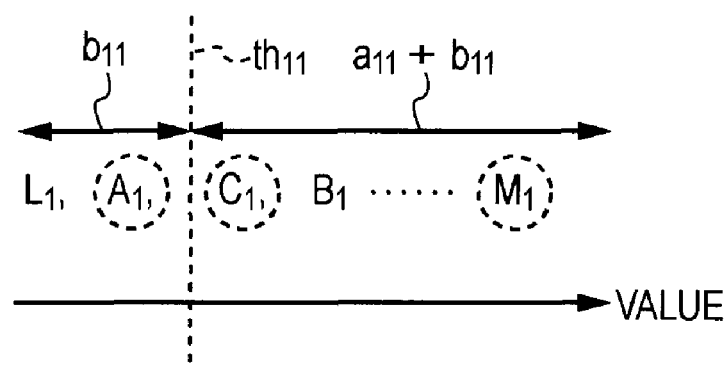
FIG. 11 is a diagram illustrating setting of a weak learner.

For example, when, as shown in FIG. 11, j=1 and the clothing features of the pair k (=1) of clothing feature points are arranged in ascending order or descending order ($L_1, A_1, B_1, \ldots, M_1$), a threshold value $th_{11}$ is set between the clothing features $A_1$ and $C_1$. In the range where the clothing feature is less than or equal to the threshold value $th_{11}$ (in the range indicated by "$b_{11}$", it is recognized that the target object is not included. In contrast, in the range where the clothing feature is greater than the threshold value $th_{11}$ (in the range indicated by "$a_{11}+b_{11}$", it is recognized that the target object is included. In this case, since the clothing feature $A_1$ is the clothing feature of a training image that contains the target object to be recognized, an error occurs. In addition, since the clothing feature $C_1$ and $M_1$ are the clothing features of training images that do not contain the target object to be recognized, an error occurs.

In the example shown in FIG. 11, the threshold value $th_{11}$ is set at a position so that the recognition error rate $e_{11}$ of the target object for the pair k is minimized. For example, if the threshold value $th_{11}$ is set at a position so that the error rate $e_{11}$ is not minimized, the learner setting unit 104 changes the position of the threshold value $th_{11}$ and searches for the position of the threshold value $th_{11}$ at which the error rate $e_{11}$ is minimized while referring to the error rates $e_{11}$ at all of the positions. Thus, the learner setting unit 104 sets the position of the threshold value $th_{11}$ to that position.

The error rate computing unit 104a sums the weights $W_i$ of the training images from which the clothing features that causes an error are extracted on the basis of the true-false information (the label) regarding the training images and computes the error rate $e_{jk}$ as follows:

$$e_{jk}=E_w[1_{(y\neq f_{jk})}] \tag{8}$$

In equation (8), the expression $y \neq f_{jk}$ indicates the condition of the pair k of clothing feature points that causes an error, and $E_w$ denotes addition of the weight of the training image that causes an error.

Furthermore, the learner setting unit 104 computes the weak learner $f_{jk}(x)$ using the error rate $e_{jk}$ computed by the error rate computing unit 104a and the threshold value $th_{jk}$. For example, when the weak learner $f_{jk}(x)$ is a function called "regression stump", the weak learner $f_{jk}(x)$ can be computed as follows:

$$f_{jk}(x)=a_{jk}(x[\dim_k]>th_{jk})+b_{jk} \tag{9}$$

In equation (9), $x[\dim_k]$ represents the clothing feature of the pair k of clothing feature points. In addition, the term $a_{jk}(x[\dim_k]>th_{jk})$ represents a function that returns a value $a_{jk}$ if the clothing feature $x[\dim_k]$ is greater than a threshold value $th_{jk}$ and that returns "0" if the clothing feature $x[\dim_k]$ is less than or equal to the threshold value $th_{jk}$.

In addition, the values $a_{jk}$ and $b_{jk}$ used in equation (9) are computed using the error rate $e_{jk}$. More specifically, for example, a reliability $c_j$ described below is used as the values $a_{jk}$. The reliability $c_j$ can be computed using the error rate $e_{jk}$. Note that the values $a_{jk}$ and $b_{jk}$ may be predetermined values obtained in advance.

In this way, the weak learner $f_{jk}(x)$ is set for each of the groups $Gr_k$. When the error rate $e_{jk}$ is supplied from the learner setting unit 104 to the learner selecting unit 105, the processing proceeds from step S54 to step S55.

In step S55, the learner selecting unit 105 selects, from among the N weak learners $f_{jk}(x)$, the weak learner $f_{jk}(x)$ that minimizes the error rate $e_{jk}$ on the basis of the N error rates $e_{jk}$ for each of the pairs K supplied from the learner setting unit 104. Thereafter, the learner selecting unit 105 acquires the selected weak learner $f_{jk}(x)$ from the learner setting unit 104.

In step S56, the learner selecting unit 105 computes the reliability $c_j$ of the selected weak learner $f_{jk}(x)$ on the basis of the error rate $e_{jk}$ of the selected weak learner $f_{jk}(x)$ and supplies the computed reliability $c_j$ to the weight updating unit 106. The reliability $c_j$ can be expressed as follows:

$$c_j=\log((1-e_j)/e_j) \tag{10}$$

In equation (10), $e_j$ represents the error rate $e_{jk}$ of the selected weak learner $f_{jk}(x)$, that is, the minimum error rate $e_{jk}$ among the N error rates $e_{jk}$. Hereinafter, the weak learner of the pair k selected in step S55 is also referred to as a weak learner $f_j(x)$, and the error rate $e_{jk}$ of the weak learner $f_j(x)$ is also referred to as an error rate $e_j$.

In step S57, the weight updating unit 106 computes the following equation using the supplied reliability $c_j$:

$$W_i=W_i \exp[-c_j \cdot 1_{(y\neq f_j(x))}], i=1, 2, \ldots N \tag{11}$$

Thus, the weight updating unit 106 re-computes the weight $W_i$ of each of the training images $PI_i$ and updates the weights $W_i$ by normalizing the weights $W_i$. The weight updating unit 106 then supplies the weights $W_i$ to the weight setting unit 102. The weight setting unit 102 assigns the weights $W_i$ to the training images $PI_i$ on the basis of the weights $W_i$ supplied from the weight updating unit 106.

That is, equation (11) indicates that the weight $W_i$ of the training image that contains the clothing feature causing an error is increased.

In step S58, the learner selecting unit 105 updates the stored clothing learner $R(x)$ using the newly obtained weak learner $f_j(x)$. That is, the learner selecting unit 105 updates the clothing learner $R(x)$ by computing the following equation:

$$R(x)=R'(x)+f_j(x) \tag{12}$$

In equation (12), $R'(x)$ denotes the clothing learner stored in the learner selecting unit 105 before being updated, and $f_j(x)$ denotes the newly obtained weak learner $f_j(x)$. That is, the learner selecting unit 105 adds the newly obtained weak learner $f_j(x)$ to the stored clothing learner $R'(x)$ so as to update the clothing learner.

In step S59, the learner selecting unit 105 stores the clothing feature of the pair k of clothing feature points corresponding to the weak learner $f_j(x)$ that minimizes the error rate $e_{jk}$. The stored clothing feature serves as a tentative clothing feature for identification of the pair k to be substituted into the weak learner $f_j(x)$.

In step S60, the learner selecting unit 105 determines whether the counter j is greater than or equal to L. If the counter j is not greater than or equal to L, the processing proceeds to step S61, where the learner selecting unit 105 increments the counter j by one. Thereafter, the processing returns to step S52, and the above-described processing is repeated.

That is, new weak learners $f_{jk}(x)$ are set for the N pairs k by using the newly set weight $W_i$ of each of the training images, and the weak learner $f_{jk}(x)$ that minimizes the error rate $e_{jk}$ is selected from among the weak learners $f_{jk}(x)$. Thereafter, the clothing learner is updated using the selected weak learner $f_{jk}(x)$.

However, if, in step S60, the counter j is greater than or equal to L, the processing proceeds to step S62, where the learner selecting unit 105 outputs the stored clothing learner and the tentative feature for identification and the training image to the tentative integrated learner generating unit 27. Thereafter, the processing proceeds to step S15 shown in FIG. 5.

Through the above-described processing, the clothing learner formed from the L weak learners $f_j(x)$ ($1 \leq j \leq L$) having relatively low error rate is supplied to the tentative integrated learner generating unit 27. In addition, the clothing features of the pair k of clothing feature points to be used for each of the weak learners $f_j(x)$, that is, the tentative features for recognition are supplied to the tentative integrated learner generating unit 27. Here, $L \leq N$.

Note that the clothing learner indicated by equation (12) is a function that outputs information as to whether the image includes the target object to be recognized and, more precisely, the likelihood of the image including the target object. The learning process in which, as illustrated by the flowchart in FIG. 9, a weak learner is repeatedly added so that a learner is generated is called a "Discrete AdaBoost algorithm".

In the clothing learner generating process, processing is repeated in which a weak learner and the error rate are computed for each pair of clothing feature points so that the weight of a clothing feature in a training image having a high error rate is sequentially increased while the weight of a clothing feature in a training image having a low error rate is sequentially decreased. Accordingly, each time the repeat processing (the processing from step S52 to step S61) is performed, the clothing feature used for setting a weak learner (i.e., the clothing feature selected in step S52) can be easily selected from a training image having an increasingly high error rate. Accordingly, the clothing features are selected from a large number of training images that are not easily recognized. As a result, the recognition rate of the target object in the image can be increased.

In addition, in the repeat processing (the processing from step S52 to step S61), the learner selecting unit 105 selects the weak learner corresponding to the pair having the lowest error rate at all times. Accordingly, by repeating the learning process, the weak learner corresponding to the pair of clothing feature points having the highest reliability is selected at all times and is added to a clothing learner. Therefore, as the processing is repeated, a weak learner having a high accuracy is sequentially added.

Furthermore, the clothing learner is a learner that determines whether the image of a person representing a target object is contained in an image using a clothing feature. The pair of clothing feature points corresponding to the clothing feature that is substituted into each of the weak learners that form the clothing learner is the pair that is optimal for detecting the target object from an input image among a plurality of pairs of clothing feature points.

Figure 12:
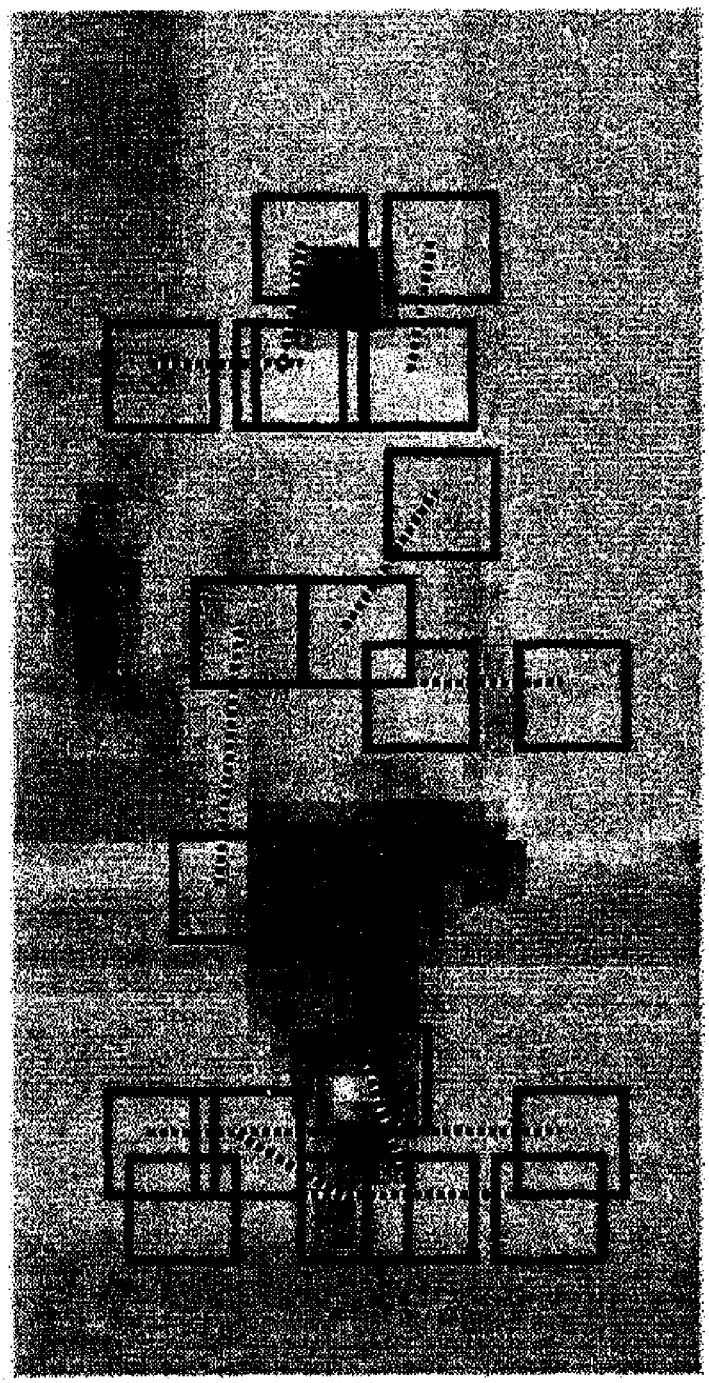
FIG. 12 is a diagram illustrating a pair of clothing feature points.

For example, as shown in FIG. 12, the pair of clothing feature points corresponding to the clothing feature that is substituted into the clothing learner is a pair of clothing feature points surrounding the image of a person representing the target object in an image. In FIG. 12, the dotted line represents a line between two clothing feature points that form a pair. The square the center of which is an end of the dotted line represents a texture area used for computing the clothing feature.

In the example shown in FIG. 12, the following two types of pairs of clothing feature points are selected: a pair of clothing feature points that are part of the item of clothing worn on the upper body of the person in the image and that cause the distance between the textures, that is, the clothing feature to be small, and a pair of clothing feature points one of which is located in the item of clothing of the person and the other of which is located in the background, not the person, and that causes the clothing feature to be large is selected.

Figure 13:
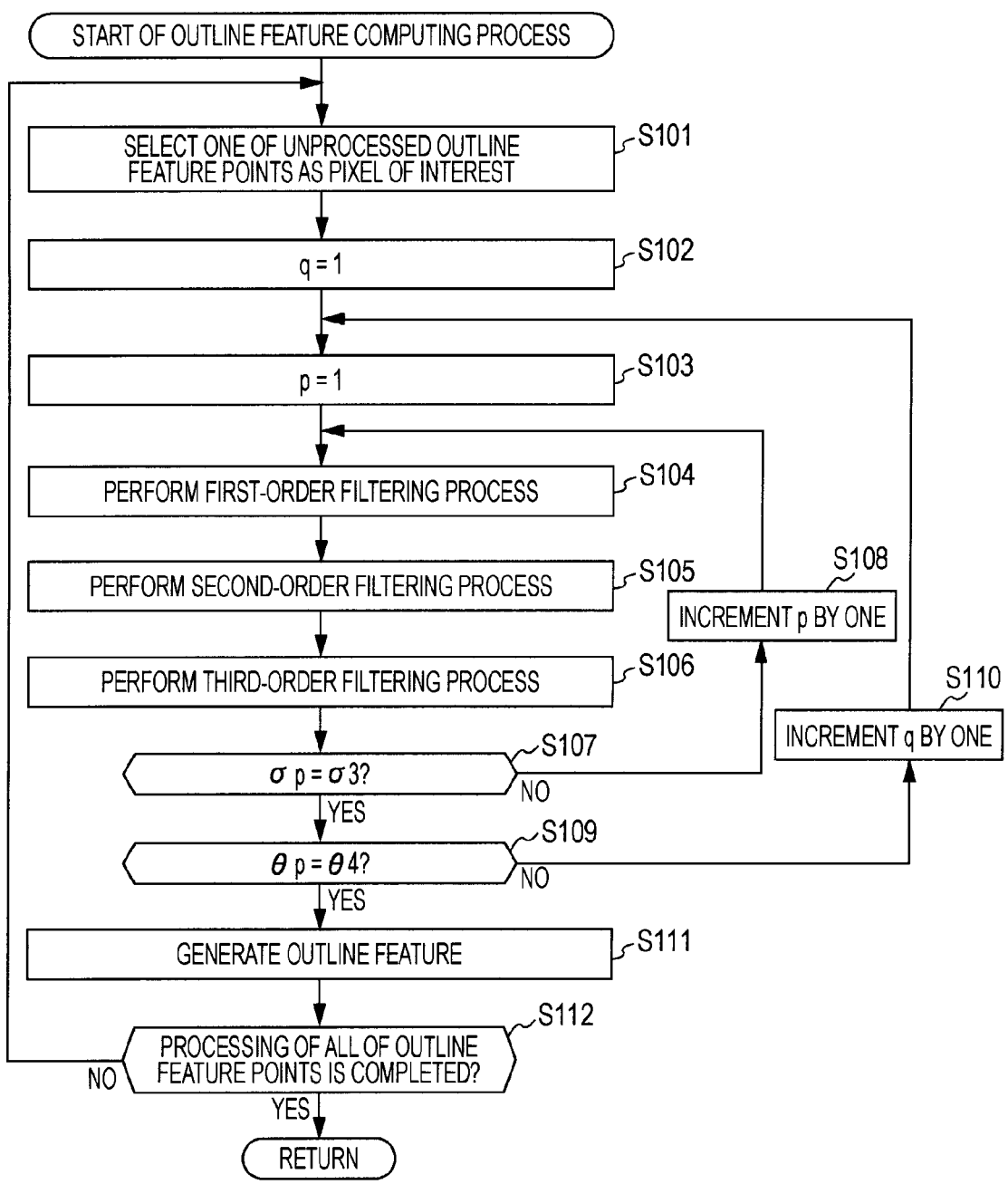
FIG. 13 is a flowchart of an exemplary outline feature computing process.

An exemplary outline feature computing process corresponding to the process performed in step S16 shown in FIG. 5 is described next with reference to the flowchart shown in FIG. 13. In the outline feature computing process, the outline feature of each of outline feature points in the input training image is computed.

In step S101, the outline feature computing unit 25 and, more specifically, the first-order filter processing unit 61, the second-order filter processing unit 62, and the third-order filter processing unit 63 of the outline feature computing unit 25 select one of unprocessed outline feature points as a pixel of interest from among the outline feature points supplied from the outline feature point extracting unit 24.

In step S102, the outline feature computing unit 25 sets a counter q that indicates a direction θq to 1. Thus, the direction θq is set to a direction θ1.

In step S103, the outline feature computing unit 25 sets a counter p that indicates a Gauss width σp to 1. Thus, the Gauss width σp is set to a Gauss width σ1.

In step S104, the first-order filter processing unit 61 performs a first-order filter process. That is, the first-order filter processing unit 61 sets the Gauss width to θp and sets the direction to θq and computes equation (2) on the basis of the pixel value of a pixel of interest to be processed. The first-order filter processing unit 61 then supplies the result of the filtering process to the feature generating unit 64. That is, the direction θ in equation (2) is set to θq, and equation (2) is computed. Thus, the outline is extracted.

In step S105, the second-order filter processing unit 62 performs a second-order filter process. That is, the second-order filter processing unit 62 sets the Gauss width to σp and sets the direction to θq and computes equation (3) on the basis of the pixel value of the pixel of interest to be processed. The second-order filter processing unit 62 then supplies the result of the filtering process to the feature generating unit 64. That is, the direction θ in equation (3) is set to θq, and equation (3) is computed. Thus, the outline is extracted.

In step S106, the third-order filter processing unit 63 performs a third-order filter process. That is, the third-order filter processing unit 63 sets the Gauss width to σp and sets the direction to θq and computes equation (5) on the basis of the pixel value of the pixel of interest to be processed. The third-order filter processing unit 63 then supplies the result of the filtering process to the feature generating unit 64. That is, the direction θ in equation (5) is set to θq, and equation (5) is computed. Thus, the outline is extracted.

In step S107, the outline feature computing unit 25 determines whether the Gauss width σp is σ3, that is, whether the counter p=3. If, in step S107, the Gauss width σp is not σ3, the processing proceeds to step S108, where the outline feature computing unit 25 increments the counter p by one. For example, if the counter p=1, the counter p is incremented by one. Thus, p=2. Accordingly, the Gauss width σp is set to σ2. After the counter p is incremented by one, the processing returns to step S104. The above-described processing is repeated from step S104.

However, if, in step S107, the Gauss width σp is σ3, the processing proceeds to step S109, where the outline feature computing unit 25 determines whether the direction θq is θ4, that is, whether the counter q=4.

If, in step S109, the direction θq is not θ4, the processing proceeds to step S110, where the outline feature computing unit 25 increments the counter q by one. For example, if the counter q=1, the counter q is incremented by one. Thus, q=2. Accordingly, the direction θq is set to θ2. After the counter q is incremented by one, the processing returns to step S103. The above-described processing is repeated from step S103.

However, if, in step S109, the direction θq is θ4, the processing proceeds to step S111, where the feature generating unit 64 combines the computation results supplied from the first-order filter processing unit 61, the second-order filter processing unit 62, and the third-order filter processing unit 63 as an outline feature. In this way, the outline feature for one outline feature point is generated.

In step S112, the outline feature computing unit 25 determines whether the process is completed for all of the outline feature points. For example, if the outline features are computed for all of the outline feature points supplied from the outline feature point extracting unit 24, it is determined that the process is completed.

If, in step S112, it is determined that the process has not been performed for all of the outline feature points, the processing returns to step S101, where the next outline feature point is selected as the pixel of interest, However, if, in step S112, it is determined that the process has been performed for all of the outline feature points, the feature generating unit 64 supplies the training image supplied from the outline feature point extracting unit 24 and the generated outline features of the outline feature points to the outline learner generating unit 26. Thereafter, the processing proceeds to step S17 shown in FIG. 5.

Note that, in addition to the steerable filter, a Gabor filter may be used for extracting an outline feature from a training image.

In addition, in the learning process illustrated in FIG. 5, after the outline features of the outline feature points are computed in the outline feature computing process performed in step S16, an outline learner generating process is performed in step S17. In the outline learner generating process, the outline learner generating unit 26 generates an outline learner T(x) using the training image and the outline features supplied from the outline feature computing unit 25. Note that since the outline learner generating process is similar to the clothing learner generating process illustrated in FIG. 9, the description thereof is not repeated.

That is, the clothing learner generating process is different from the outline learner generating process only in that the feature to be processed is a clothing feature or an outline learner. Accordingly, in the outline feature computing process, the sum of weak learners corresponding to the outline features of the outline feature points having the lowest error rate is computed, and the sum is defined as the outline learner T(x). Thereafter, the outline learner generating unit 26 outputs the generated outline learner, the outline feature defined as a tentative feature for identification, and the learning image to the tentative integrated learner generating unit 27.

In addition, in the learning process, the tentative integrated learner generating unit 27 combines the clothing learner R(x) with the outline learner T(x) so as to compute a tentative integrated learner U(x). When the tentative integrated learner generating unit 27 supplies the training image, the tentative integrated learner U(x), and the tentative features for identification (the clothing feature and the outline feature) to the integrated learner generating unit 28, an integrated learner generating process is performed in step S19.

Figure 14:
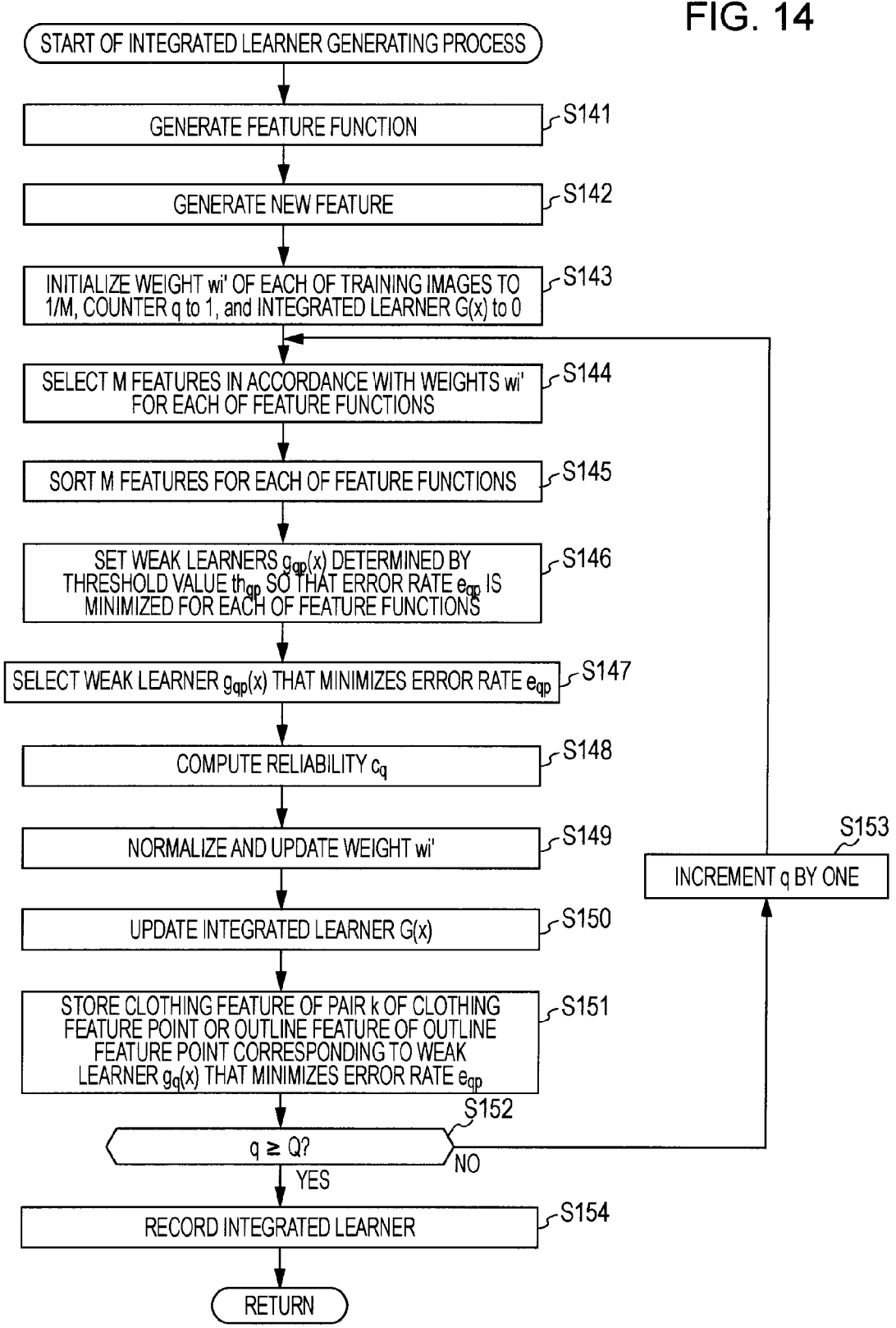
FIG. 14 is a flowchart of an exemplary integrated learner generating process.

The integrated learner generating process corresponding to the process performed in step S19 shown in FIG. 5 is described next with reference to the flowchart shown in FIG. 14.

In step S141, the feature function generating unit 131 generates desired number of feature functions using the tentative integrated learner U(x) supplied from the tentative integrated learner generating unit 27.

For example, assume that the tentative integrated learner U(x) represented by equation (7) includes S weak learners (where S is a natural number), and the tentative integrated learner U(x) is expressed as follows:

$$U(x) = \alpha \cdot R(x) + \beta \cdot T(x) \qquad (13)$$

$$= \sum_{s=1}^{S} u_S(x)$$

$$= \sum_{s=1}^{S} (a_s(x[dim_s] > th_s) + b_s)$$

Note that a weak learner $u_s(x)$ in equation (13) ($1 \leq s \leq S$) is a weak learner that forms the clothing learner R(x) multiplied by a constant α or a weak learner that forms the outline learner T(x) multiplied by a constant β.

In addition, the value of the term "$a_s(x[dim_s]>th_s)$" of the weak learner $u_s(x)$ in equation (13) is $a_s$ if the feature $x[dim_s]$ acquired from the feature point corresponding to the tentative feature for identification is greater than or equal to a threshold value $th_s$ and is 0 if the feature $x[dim_s]$ is less than the threshold value $th_s$. Here, the term "feature" represents a clothing feature or an outline feature. The threshold value $th_s$ is a threshold value for a weak learner that forms the clothing learner R(x) or the outline learner T(x).

Accordingly, for example, when the weak learner $u_s(x)$ is obtained by multiplying the constant α by a weak learner $f_j(x)$ that forms the clothing learner R(x), the threshold value $th_s$ serves as the threshold value $th_j$ for the weak learner $f_j(x)$. The feature $x[dim_s]$ serves as a clothing feature to be substituted into the weak learner $f_j(x)$.

By using such a tentative integrated learner U(x), the feature function generating unit 131 generates P feature function $Z_p(x)$ (where P is any natural number and $1 \leq p \leq P$).

More specifically, the feature function generating unit 131 selects R weak learners $u_s(x)$ (where R is any natural number) from among S weak learners $u_s(x)$ that form the tentative integrated learner U(x) and computes the linear sum of the selected R weak learners $u_s(x)$ so as to generate a feature function $Z_p(x)$. The feature function generating unit 131 repeats such processing P times so as to generate P feature functions $Z_1(x)$ to $Z_p(x)$.

The number R of weak learners that form the feature function $Z_p(x)$ is changed to any number each time the feature function $Z_p(x)$ is generated. That is, the number of weak learners that form each of the feature functions $Z_p(x)$ is not necessarily constant.

Figure 15:
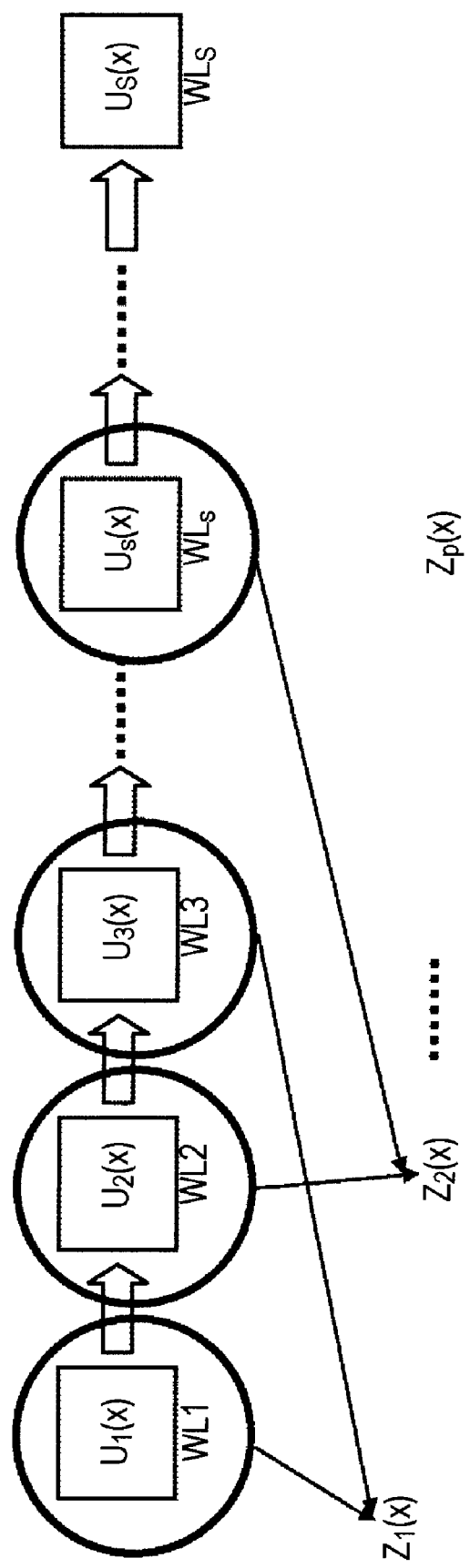
FIG. 15 is a diagram illustrating generation of a feature function.

For example, as shown in FIG. 15, when the tentative integrated learner U(x) is formed from S weak learners $u_s(x)$, some of the S weak learners $u_s(x)$ are selected. The sum of the selected weak learners $u_s(x)$ is defined as the feature function $Z_p(x)$.

In the example shown in FIG. 15, the weak learner $u_1(x)$ and the weak learner $u_3(x)$ are selected, and the sum of the two weak learners is defined as the feature function $Z_1(x)$. In addition, the weak learner $u_2(x)$ and the weak learner $u_s(x)$ are selected, and the sum of the two weak learners is defined as the feature function $Z_2(x)$.

In step S142, the feature function generating unit 131 generates a new feature $Z_{pi}$ ($1 \leq p \leq P$, and $1 \leq i \leq M$) for each of the training images $PI_i$ ($1 \leq i \leq M$) received from the tentative integrated learner generating unit 27 using the generated P feature functions $Z_p(x)$.

That is, the feature function generating unit 131 defines, as a new feature $Z_{pi}$ of the training image $PI_i$, a value obtained by substituting the tentative feature for identification of the training image $PI_i$ corresponding to the weak learner $u_s(x)$ that forms the feature function $Z_p(x)$ into the feature function $Z_p(x)$. In this way, new P features $Z_{1i}$ to $Z_{pi}$ can be obtained for one training image $PI_i$.

Accordingly, for example, the features $Z_{11}$ to $Z_{P1}$ of the training image $PI_1$ correspond to the clothing features $A_1$ to $A_N$ of the training image $PI_1$ shown in FIG. 10, respectively. However, the number P of the new feature is not necessarily the same as the number of the clothing features or the outline features.

After the feature function generating unit 131 computes the features $Z_{pi}$ of each of the training image $PI_i$, the feature function generating unit 131 supplies these features $Z_{pi}$ to the sampling unit 132.

In step S143, the weight setting unit 133 initializes the weights $W_i$ of the training images $PI_i$ ($1 \leq i \leq M$) to 1/M. The learner selecting unit 136 initializes the counter q to 1 and initializes the integrated learner G(x) that is the sum of the weak learners to 0.

Here, i serves as an identifier of the training image $PI_i$ ($1 \leq i \leq M$). Through the process performed in step S143, the weights $W_i$ of all of the training images $PI_i$ are set to the same normalized value (=1/M). In addition, the counter q contains the predetermined number of updates of the integrated learner G(x).

In step S144, the sampling unit 132 selects M features $Z_{pi}$ for each of the feature functions $Z_p(x)$ ($1 \leq p \leq P$) from among the features $Z_{pi}$ of each of the training images $PI_i$ in accordance with weights $W_i'$ of the training images $PI_i$. The sampling unit 132 then supplies the selected M features Z to the sorting unit 134.

For example, suppose that the features $Z_{pi}$ of M training images $PI_i$ to $PI_M$ are supplied from the feature function generating unit 131 to the sampling unit 132, and the features $Z_{pi}$ of the training images $PI_i$ obtained from the same feature function form a group $Gr_p$ ($1 \leq p \leq P$).

In such a case, the sampling unit 132 selects, from among the features $Z_{pi}$ of each of the functions $Z_p(x)$, that is, each of the groups $Gr_p$, M features $Z_{pi}$ in accordance with the weights $W_i'$ of the training images $PI_i$. For example, the sampling unit 132 selects, from among the features $Z_{11}$ to $Z_{1M}$ in the group $Gr_1$, M features $Z_{1i}$ in accordance with the weights $W_i'$. Note that, in the first processing, all of the weights $W_i'$ is 1/M.

Accordingly, when M features are selected, all of the features are stochastically selected. Therefore, according to the present embodiment, in the first processing, all of the features are selected for each of the groups $Gr_i$. However, in practice, the same feature may be selected in duplicate.

In step S145, the sorting unit 134 sorts the M features $Z_{pi}$ selected for each of the P groups $Gr_p$, that is, for each of the feature function $Z_p(x)$ in ascending order or descending order. Thereafter, the sorting unit 134 supplies the sorted M features $Z_{pi}$ to the learner setting unit 135.

In step S146, the learner setting unit 135 controls an error rate computing unit 135a so that the error rate computing unit 135a computes an error rate $e_{qp}$ while changing the threshold value for each of the groups $Gr_p$, that is, each of the feature functions $Z_p(x)$ on the basis of the true-false information (the label) attached to the training image supplied from the tentative integrated learner generating unit 27. In this way, the threshold value is determined so that the error rate $e_{qp}$ is minimized.

Here, a threshold value $th_{qp}$ for each of the feature functions $Z_p(x)$ functions as a weak learner $g_{qp}(x)$. The learner setting unit 135 supplies the error rates $e_{qp}$ of the weak learners $g_{qp}(x)$ to the learner selecting unit 136. That is, each of the P weak learners $g_{qp}(x)$ is set for the corresponding one of the P functions $Z_p(x)$, and the error rate $e_{qp}$ is computed for each of the P weak learners $g_{qp}(x)$.

Note that the weak learner $g_{qp}(x)$ is a function that outputs a predetermined value $(a_{qp}+b_{qp})$ if the image of a target object is contained in an area of the feature point of an image to be recognized and that outputs a predetermined value $b_{qp}$ if the image of the target object is not contained in the area. For example, when the features $Z_{1i}$ obtained from the feature function $Z_1(x)$ are arranged in ascending order or descending order, a threshold value $th_{q1}$ is set in a similar manner illustrated in FIG. 11.

The error rate computing unit 135a performs computation using the above-described equation (8). The error rate computing unit 135a sums the weights $W_i'$ of the training images from which the features $Z_{pi}$ that causes an error are extracted on the basis of the true-false information (the label) regarding the training images and computes the error rate $e_{qp}$. That is, by computing $E_w[1_{(y \neq f_{jk})}]$, the error rate $e_{qp}$ can be obtained.

In addition, the learner setting unit 135 computes the weak learner $g_{qp}(x)$ using the error rate $e_{qp}$ computed by the error rate computing unit 135a and the threshold value $th_{qp}$. For example, when the weak learner $g_{qp}(x)$ is a function called "regression stump", the weak learner $g_{qp}(x)$ can be computed as follows:

$$g_{qp}(x) = a_{qp}(Z_p(x) > th_{qp}) + b_{qp} \quad (14)$$

Note that the weak learner is not limited to the function "regression stump", but may be a function such as "stump".

In equation (14), $Z_p(x)$ represents a feature function $Z_p(x)$. The term $a_{qp}(Z_p(x) > th_{qp})$ represents a function that returns a value $a_{qp}$ if a feature $x[dim_p]$ is greater than or equal to a threshold value $th_{qp}$ and that returns "0" if the feature $x[dim_p]$ is less than the threshold value $th_{qp}$, where $x[dim_p]$ is a value obtained by substituting the clothing feature or the outline feature of the clothing feature point or the outline feature point corresponding to the tentative feature for identification into $Z_p(x)$.

In addition, the values $a_{qp}$ and $b_{qp}$ used in equation (14) are computed using the error rate $e_{qp}$. More specifically, for example, a reliability $c_q$ described below is used as the values $a_{qp}$. The reliability $c_q$ can be computed using the error rate $e_{qp}$. Note that the values $a_{qp}$ and $b_{qp}$ may be predetermined values obtained in advance.

In this way, the weak learner $g_{qp}(x)$ is set for each of the groups $Gr_p$. When the error rate $e_{qp}$ is supplied from the learner setting unit 135 to the learner selecting unit 136, the processing proceeds from step S146 to step S147.

In step S147, the learner selecting unit 136 selects, from among the P weak learners $g_{qp}(x)$, the weak learner $g_{qp}(x)$ that minimizes the error rate $e_{qp}$ on the basis of the P error rates $e_{qp}$ for each of the feature functions $Z_p(x)$ supplied from the learner setting unit 135. Thereafter, the learner selecting unit 136 acquires the selected weak learner $g_{qp}(x)$ from the learner setting unit 135.

In step S148, through computation similar to computation using the above-described equation (10), the learner selecting unit 136 obtains the reliability $c_q$ of the selected weak learner $g_{qp}(x)$ on the basis of the error rate $e_{qp}$ of the selected weak learner $g_{qp}(x)$ and supplies the computed reliability $c_q$ to the weight updating unit 137.

In this case, by setting $e_q$ to the error rate $e_{qp}$ of the selected weak learner $g_{qp}(x)$ among the error rates $e_{qp}$, that is, the minimum error rate $e_{qp}$ among the P error rates $e_{qp}$, $e_j$ shown in equation (10) serves as $e_q$ and, therefore, the reliability $c_q$ can be computed. Hereinafter, the weak learner of the group $Gr_p$ selected in step S147 is also referred to as a weak learner $g_q(x)$, and the error rate $e_{qp}$ of the weak learner $g_q(x)$ is also referred to as an error rate $e_q$.

In step S149, the weight updating unit 137 performs computation similar to the above-described equation (11) using the supplied reliability $c_q$. Thus, the weight updating unit 137 re-computes the weight $W_i'$ of each of the training images $PI_i$ and updates all of the weights $W_i'$ by normalizing the weights $W_i'$. The weight updating unit 137 then supplies the weights $W_i'$ to the weight setting unit 133. That is, $W_i' \exp[-c_q \cdot 1_{(y \neq fgq)}]$ is computed, and the weights $W_i'$ are updated. The weight setting unit 133 assigns the update weights $W_i'$ to the training images $PI_i$ on the basis of the update weights $W_i'$ supplied from the weight updating unit 137.

In step S150, the learner selecting unit 136 updates the stored integrated learner $G(x)$ using the newly obtained weak learner $g_q(x)$. That is, the learner selecting unit 136 updates the integrated learner $G(x)$ by computing the following equation:

$$G(x) = G'(x) + g_q(x) \quad (15)$$

In equation (15), $G'(x)$ denotes the integrated learner stored in the learner selecting unit 136 before being updated, and $g_q(x)$ denotes the newly obtained weak learner $g_q(x)$. That is, the learner selecting unit 136 adds the newly obtained weak learner $g_q(x)$ to the stored integrated learner $G'(x)$ so as to update the integrated learner.

In step S151, the learner selecting unit 136 stores the tentative feature for identification corresponding to the weak learner $g_q(x)$ that minimizes the error rate $e_{qp}$, that is, at least one of the clothing feature of the pair k of the clothing feature points and the outline feature of the outline feature point. The stored tentative feature for identification serves as a feature for identification that is the clothing feature of the clothing feature point of the pair k or the feature of the outline feature point to be substituted into the weak learner $g_q(x)$.

In step S152, the learner selecting unit 136 determines whether the counter q is greater than or equal to Q. If the counter q is not greater than or equal to Q, the processing proceeds to step S153, where the learner selecting unit 136 increments the counter q by one. Thereafter, the processing returns to step S144, and the above-described processing is repeated.

That is, new weak learners $g_{qp}(x)$ are set for the P feature function $Z_p(x)$ by using the newly set weight $W_i'$ of each of the training images, and the weak learner $g_{qp}(x)$ that minimizes the error rate $e_{qp}$ is selected from among the weak learners $g_{qp}(x)$. Thereafter, the integrated learner is updated using the selected weak learner $g_{qp}(x)$.

However, if, in step S152, the counter q is greater than or equal to Q, the processing proceeds to step S154, where the learner selecting unit 136 supplies the stored integrated learner and the tentative feature for identification to the learner recording unit 12. The learner recording unit 12 stores the received integrated learner and the tentative feature for identification. Thereafter, the integrated learner generating process is completed, and the processing returns to the learning process shown in FIG. 5.

Through the above-described processing, the integrated learner formed from the Q weak learners $g_q(x)$ ($1 \leq q \leq Q$) having relatively low error rate is supplied to the learner recording unit 12. In addition, the clothing features of the pair k of clothing feature points to be used for each of the weak learners $g_q(x)$ and the outline feature of the outline feature point are supplied to the learner recording unit 12 as the tentative features for identification. Here, Q is any number that satisfies $Q \leq P$. That is, the integrated learner $G(x)$ is a linear sum of any number Q of weak learners $g_q(x)$.

In this way, the learning apparatus 11 selects some of weak learners that form the tentative integrated learner obtained through statistical learning and generates a feature function formed from the sum of the weak learners. Thereafter, the learning apparatus 11 defines a value obtained by substituting the feature into the feature function, that is, the identification score of the target object obtained using the weak learner that is statistically trained once as a new feature. In addition, through statistical learning using the new feature, the learning apparatus 11 generates the final integrated learner.

Figure 16:
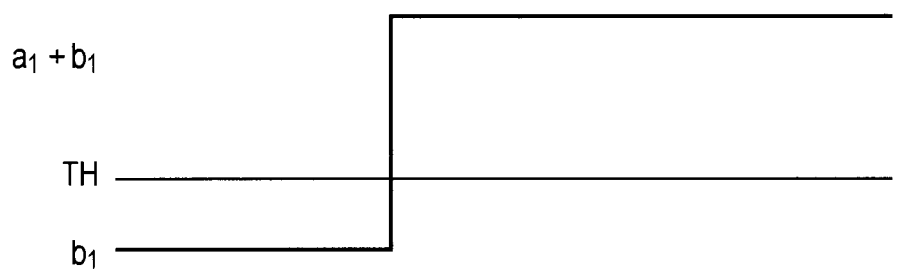
FIG. 16 is a diagram illustrating a newly defined feature.

For example, as shown in FIG. 16, when a feature function $Z_p(x)$ is formed from one weak learner $u_1(x)$, possible values of the feature $Z_p$ obtained by substituting the feature (the tentative feature for identification) corresponding to the weak learner $u_1(x)$ into the feature function $Z_p(x)$ are the following two values: $(a_1+b_1)$ and $b_1$. Note that, in FIG. 16, the ordinate represents the value of the feature $Z_p$, and the abscissa represents the feature $x[\dim_1]$.

In FIG. 16, the value of feature $Z_p$ represents the likelihood of an image being an image including the target object. If the value of feature $Z_p$ is greater than or equal to a predetermined reference threshold value TH, it is determined that the image contains the target object. However, if the value of feature $Z_p$ is less than the threshold value TH, it is determined that the image does not contain the target object.

Figure 17:
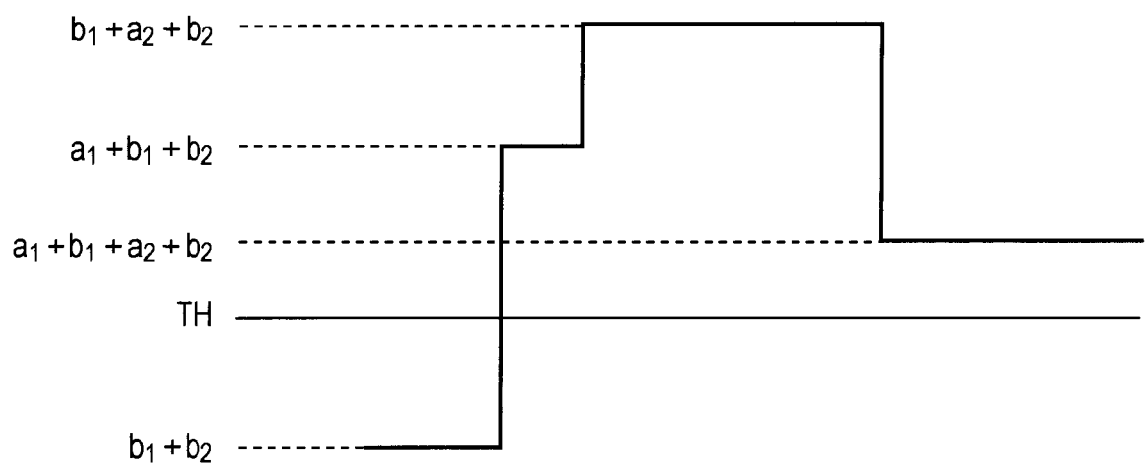
FIG. 17 is a diagram illustrating a newly defined feature.

Inn addition, as shown in FIG. 17, when a feature function $Z_p(x)$ is formed from, for example, two weak learners $u_1(x)$ and $u_2(x)$, the number of possible values of the feature $Z_p$ obtained by substituting the features corresponding to the weak learner $u_1(x)$ and $u_2(x)$ into the feature function $Z_p(x)$ are four. Note that, in FIG. 17, the ordinate represents the value of the feature $Z_p$, and the abscissa represents the value of the feature.

In FIG. 17, the value of feature $Z_p$ represents the likelihood of an image being an image including the target object. The possible values are $(b_1+b_2)$, $(a_1+b_1+a_2+b_2)$, $(a_1+b_1+b_2)$, and $(b_1+a_2+b_2)$. If the value of feature $Z_p$ is greater than or equal to a predetermined reference threshold value TH, it is determined that the image contains the target object. However, if the value of feature $Z_p$ is less than the threshold value TH, it is determined that the image does not contain the target object. Accordingly, if the value of feature $Z_p$ is one of $(a_1+$ $b_1+a_2+b_2$), ($a_1+b_1+b_2$), and ($b_1+a_2+b_2$), it is determined that the image contains the target object.

Furthermore, when a feature function $Z_p(x)$ is formed from N weak learners $u_s(x)$, the number of possible values of the feature $Z_p$ obtained by substituting the feature corresponding to each of the weak learners into the feature function $Z_p(x)$ is $2^N$. Since the value of feature $Z_p$ represents the likelihood of an image being an image including the target object, the likelihood increases as the value of feature $Z_p$ increases.

In this way, as the number of the weak learners $u_s(x)$ is increased, the number of possible values of a new feature $Z_p$ obtained from the feature function $Z_p(x)$ is further increased. Accordingly, as the number of the weak learners $u_s(x)$ that form the feature function $Z_p(x)$, the distribution of the features of a more complicated sample (a target object) in the feature space can be expressed. That is, the region defined by features (the values of the features) obtained when the image contains a target object can be more accurately obtained. Thus, the detection accuracy of the target object using the features (the integrated learner) can be increased.

The integrated learner generated in the above-described manner is recorded in the learner recording unit 12 and is supplied to the recognition apparatus 13. If the recognition apparatus 13 detects the target object using the integrated learner, a person serving as the target object can be more reliably detected from an input image.

Note that while the examples shown in FIGS. 16 and 17 have been described with reference to the features having the same dimensions, that is, the features (the clothing features or the outline features) acquired from the same feature points, the features having different dimensions, in practice, are substituted into the feature function $Z_p(x)$.

The difference between Real AdaBoost and the statistical learning process performed by the learning apparatus 11 is as follows. In Real AdaBoost, the distribution of the features of a sample (a target object) is directly acquired from the training images. That is, in Real AdaBoost, a one-dimensional distribution of features is learned. In contrast, in the statistical learning process performed by the learning apparatus 11, some of the feature distributions having dimensions that are most easily separated, that is, some of the feature distributions having dimensions that are most suitable to the learning are combined together and are used for learning of the feature distributions.

Figure 18:
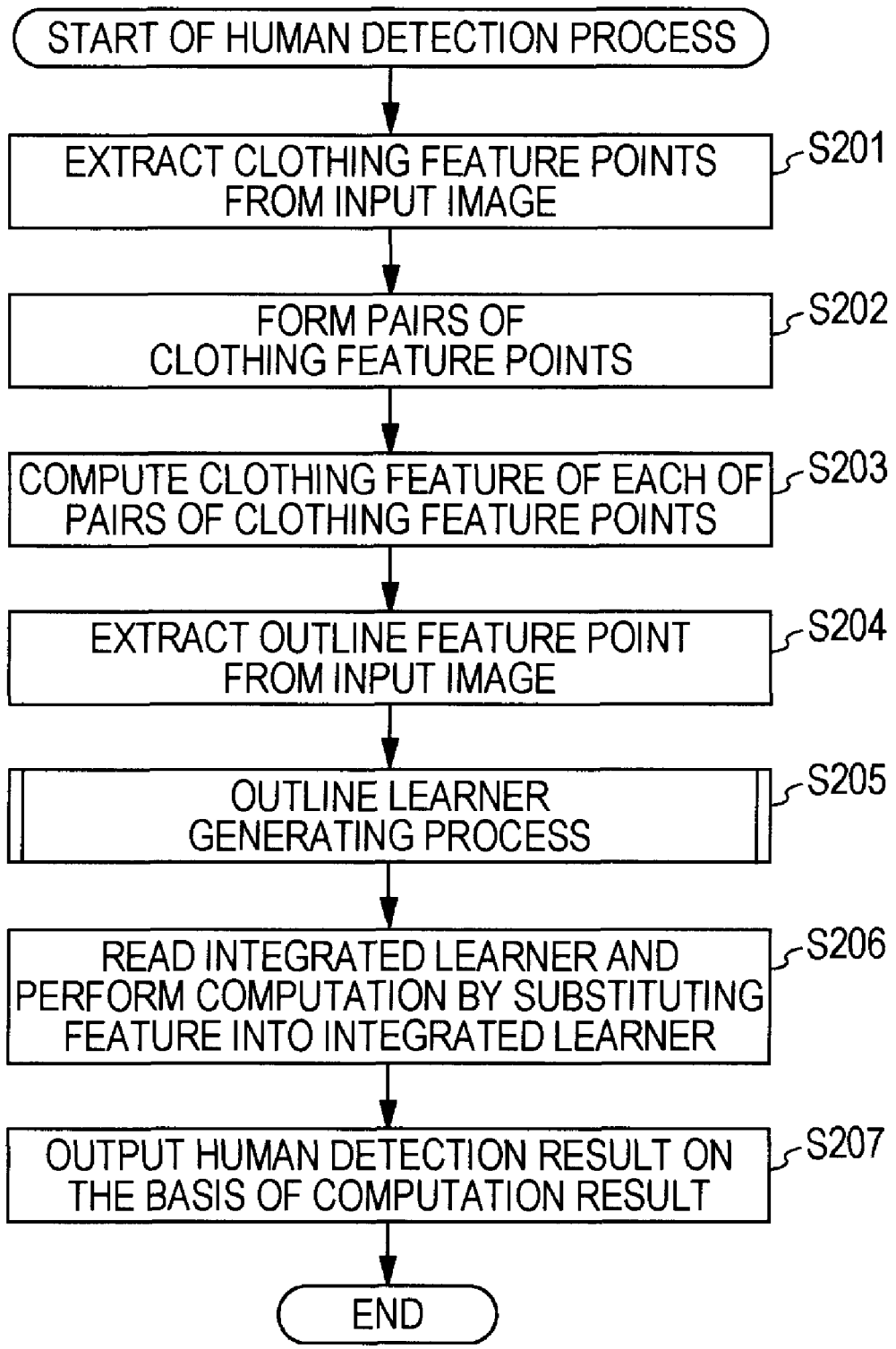
FIG. 18 is a flowchart of a human detection process.

When an input image is input to the recognition apparatus 13 and if a user instructs the recognition apparatus 13 to detect a person serving as a target object in the image, the recognition apparatus 13 starts a human detection process and detects the target object in the input image. An exemplary human detection process performed by the recognition apparatus 13 is described below with reference to the flowchart shown in FIG. 18.

Note that since the processes performed in steps S201 to S203 is similar to the processes performed in steps S11 to S13 shown in FIG. 5, respectively, the descriptions thereof are not repeated. That is, the clothing feature point extracting unit 31 extracts clothing feature points from the input image. Thereafter, the clothing feature computing unit 32 forms pairs of the clothing feature points extracted by the clothing feature point extracting unit 31 and computes the clothing features of each of the pairs. Subsequently, the clothing feature computing unit 32 supplies the clothing features obtained for the pairs to the identification computing unit 35.

In step S204, the outline feature point extracting unit 33 performs processing similar to that of step S15 shown in FIG. 5. Thus, the outline feature point extracting unit 33 extracts outline feature points from the input image and supplies the extracted feature points and the input image to the outline feature computing unit 34.

In step S205, the outline feature computing unit 34 performs an outline feature computing process on the basis of the input image and the outline feature points supplied from the outline feature point extracting unit 33 so as to compute the outline features of the outline feature points. Thereafter, the outline feature computing unit 34 supplies the computed outline features to the identification computing unit 35. Note that since this outline feature computing process is similar to the outline feature computing process illustrated in FIG. 13, the descriptions thereof is not repeated.

In step S206, the identification computing unit 35 reads out the feature for identification and the integrated learner from the learner recording unit 12 and substitutes the features into the readout learner. That is, the identification computing unit 35 performs computation by substituting the clothing feature supplied from the clothing feature computing unit 32 and the outline feature supplied from the outline feature computing unit 34 and corresponding to the feature for identification into the integrated learner G(x) acquired from the learner recording unit 12. Accordingly, the computation is performed by substituting the clothing feature or the outline feature corresponding to the feature for identification into each of the weak learners $g_q(x)$ that form the integrated learner G(x) Here, the feature substituted into each of the weak learners that form the integrated learner is the feature (the clothing feature or the outline feature) obtained from the pair of clothing feature points of the training image, the pair of clothing features in the input image located at the same position as that of the outline feature point, or the outline feature point from which the feature for identification is computed.

Through the computation in which the feature is substituted into the integrated learner, a value indicating the likelihood of the input image including the target object can be obtained. The identification computing unit 35 supplies the result of computation performed in the integrated learner to the identification result output unit 36.

In step S207, the identification result output unit 36 outputs the result of detecting a person on the basis of the result of computation supplied from the identification computing unit 35. Thereafter, the process of detecting a person is completed. That is, the identification result whether the target object is recognized in the input image (whether a person is recognized in the input image) is output. For example, if the computation result value supplied from the identification computing unit 35 is greater than or equal to a predetermined threshold value, a message indicating that a person serving as the target object is detected from the input image is output as an identification result. Alternatively, an area from which a person serving as the target object is detected may be surrounded by a frame, and the input image including the frame may be output as the identification result.

In this way, the recognition apparatus 13 extracts clothing feature points from the input image and computes the clothing feature of a pair of clothing features. In addition, the recognition apparatus 13 extracts outline feature points from the input image and computes the outline feature of the outline features. Thereafter, the recognition apparatus 13 detects the target object from the input image using the computed clothing features and outline features and the integrated learner stored in the learner recording unit 12.

As described above, by detecting the target object from the input image using the clothing features and outline features, the target object can be more reliably detected from an image. That is, if at least one of the clothing feature and the outline feature is sufficiently extracted, the target object can be reliably detected from an input image.

In addition, by using the integrated learner computed using a new feature obtained from the feature function, the target object can be more reliably detected from an input image.

While the present embodiment has been described with reference to the case in which the target object detected from an image is a person, the target object is not limited to a person. For example, any object can be detected. Furthermore, any feature extracted from the image may be used.

For example, the luminance information, the color information, and the edge information may be extracted from a training image as features, and a correlation value between the extracted features and features extracted from a model image including the image of a target object may be computed. Thereafter, the correlation value may be used as the feature for a learning process. In this case, the correlation value may be used as the feature, and a tentative learner is formed from a plurality of weak learners through statistical learning. The linear sum of some of the weak learners that form the tentative learner functions as a feature function. In addition, the feature obtained from the feature function is used so that a final learner is generated through statistical learning.

In such a case, a new feature is defined using the feature function formed from some of the weak learners that form the tentative learner obtained through a learning process and, subsequently, a final learner is generated through another learning process. Accordingly, a learner that prevents overfitting and that reliably detects a target object can be provided.

In the learning apparatus 11 shown in FIG. 1, only one of the clothing learner and the outline learner may be generated, and a feature function may be generated from the one of the clothing learner and the outline learner.

A learning method in which a new feature is defined using weak learners that form a learner obtained through a learning process and, subsequently, a final learner is obtained through another learning process has a high versatility. Accordingly, this learning method is effective for a variety of statistical learning tasks of, for example, speech or motion. In addition, since this learning method can employ the score of any one of weak learners in addition to the output of each cascade of cascade connection, the learning method can be applied to any type of Boosting learning.

The above-described series of processes can be executed not only by hardware but also by software. When the above-described series of processes are executed by software, the programs of the software are installed, from a program recording medium, in a computer incorporated in dedicated hardware or a general-purpose personal computer that can execute a variety of functions by installing a variety of programs therein.

FIG. 19 is a block diagram of an exemplary configuration of computer hardware that executes the above-described series of processes by using a program.

The computer includes a central processing unit (CPU) 501, a read only memory (ROM) 502, and a random access memory (RAM) 503, which are connected to one another via a bus 504.

In addition, an input and output interface 505 is connected to the bus 504. The following units are connected to the input and output interface 505: an input unit 506 including a keyboard, a mouse, and a microphone, an output unit 507 including a display and a speaker, a recording unit 508 including a hard disk and a nonvolatile memory, a communication unit 509 including a network interface, and a drive 510 that drives a removable medium 511, such as a magnetic disk, an optical disk, a magnetooptical disk, or a semiconductor memory.

In the computer having such a configuration, the CPU 501 loads a program stored in, for example, the recording unit 508 into the RAM 503 via the input and output interface 505 and the bus 504.

The program to be executed by the computer (the CPU 501) is recorded in the removable medium 511 serving as a packaged medium. Examples of the removable medium 511 include a magnetic disk (including a flexible disk), an optical disk (e.g., a compact disc-read only memory (CD-ROM) or a digital versatile disc (DVD)), a magnetooptical disk, and a semiconductor memory. Thus, the program is provided to the computer. Alternatively, the program may be provided via a wireless or wired transmission medium, such as a local area network, the Internet, or digital satellite broadcasting.

Subsequently, the program can be installed in the recording unit 508 via the input and output interface 505 by mounting the removable medium 511 in the drive 510. Alternatively, the program can be received via the communication unit 509 using the wireless or wired transmission medium and be installed in the recording unit 508. Still alternatively, the program can be pre-installed in the ROM 502 or the recording unit 508.

The program may be a program that executes the processes in the above-described order or a program that executes the processes in parallel or on demand.

The present application contains subject matter related to that disclosed in Japanese Priority Patent Application JP 2008-226690 filed in the Japan Patent Office on Sep. 4, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A learning apparatus comprising:
a processor:
feature extracting means for extracting a feature at a feature point in a plurality of training images including a training image that contains a target object to be recognized and a training image that does not contain the target object;
tentative learner generating means for generating a tentative learner for detecting the target object in an image, the tentative learner being formed from a plurality of weak learners through statistical learning using the training images and the feature obtained from the training images; and
learner generating means for generating a final learner that is formed from a plurality of weak learners and that detects the target object in an image by substituting the feature into a feature function formed from at least one of the weak learners that form the tentative learner so as to obtain a new feature and performing an AdaBoost type statistical learning using the new feature and the training images,
wherein the feature extracting means comprises outline feature computing means for computing an outline feature based on the training image, the outline feature computing means comprising:
a first-order filter processing unit performing a filtering process on an outline feature point extracted using a first-order differential Gauss function;

a second-order filter processing unit performing a filtering process on the outline feature point using a second-order differential Gauss function: and
a third-order filter processing unit performing a filtering process on the outline feature point using a third-order differential Gauss function.

2. The learning apparatus according to claim 1, wherein the feature function is formed from the plurality of weak learners that form the tentative learner.

3. The learning apparatus according to claim 2, wherein the learner generating means uses, as the feature function, a linear sum of any number of the weak learners among the plurality of weak learners that form the tentative learner.

4. The learning apparatus according to claim 3, wherein the learner generating means generates any number of a plurality of the features using a plurality of the corresponding feature functions, and wherein the number of the weak learners that form each of the feature functions differs.

5. A learning method for use in a learning apparatus, the learning apparatus comprising:
   feature extracting means for extracting a feature at a feature point in a plurality of training images including a training image that contains a target object to be recognized and a training image that does not contain the target object;
   tentative learner generating means for generating a tentative learner for detecting the target object in an image, where the tentative learner is formed from a plurality of weak learners through statistical learning using the training images and the feature obtained from the training images; and
   learner generating means for generating a final learner that is formed from at least one of the weak learners and that detects the target object in an image by substituting the feature into a feature function formed from at least one of the weak learners that form the tentative learner so as to obtain a new feature and performing an AdaBoost type statistical learning using the new feature and the training images,
   wherein the feature extracting means comprises outline feature computing means for computing an outline feature based on the training image,
   the method comprising the steps of:
      extracting the feature from the training images using the feature extracting means;
      generating the tentative learner through the statistical learning using the training images and the feature obtained from the training images using the tentative learner generating means;
      generating a final learner through the AdaBoost type statistical learning using the new feature and the training images using the learner generating means;
      performing a filtering process, by a first-order filter processing unit included in the outline feature computing means, on an outline feature point using a first-order differential Gauss function;
      performing a filtering process, by a second-order filter processing unit included in the outline feature computing means, on the outline feature point using a second-order differential Gauss function; and
      performing a filtering process, by a third-order filter processing unit included in the outline feature computing means, on the outline feature point using a third-order differential Gauss function.

6. A non-transitory computer-readable medium encoded with a computer program which when executed by a computer, causes the computer to perform a process comprising:
   extracting a feature at a feature point in a plurality of training images including a training image that contains a target object to be recognized and a training image that does not contain the target object;
   generating a tentative learner for detecting the target object in an image, where the tentative learner is formed from a plurality of weak learners through statistical learning using the training images and the feature obtained from the training images;
   generating a final learner that is formed from at least one of the weak learners and that detects the target object in an image by substituting the feature into a feature function formed from at least one of the weak learners that form the tentative learner so as to obtain a new feature and performing an AdaBoost type statistical learning using the new feature and the training images;
   performing a filtering process, by a first-order filter processing unit, on an outline feature point using a first-order differential Gauss function;
   performing a filtering process, by a second-order filter processing unit, on the outline feature point using a second-order differentia Gauss function; and
   performing a filtering process, by a third-order filter processing unit on the outline feature point using a third-order differential Gauss function.

7. A recognition apparatus comprising:
   a processor,
   feature extracting means for extracting a feature at a feature point in an input image; and
   detecting means for detecting a target object to be recognized from the input image by substituting the feature into a learner for detecting the target object in an image and performing computation, the learner being generated using a plurality of training images including a training image that contains the target object to be recognized and a training image that does not contain the target object;
   wherein the learner is formed by generating a tentative learner that is formed from a plurality of weak learners and that detects the target object in an image through statistical learning using the training images and the feature at the feature point of the training images, and by performing an AdaBoost type statistical learning using the training images and a new feature obtained by substituting the feature obtained from the training images into a feature function formed from at least one of the weak learners that form the tentative learner, and
   wherein the feature extracting means comprises outline feature computing means for computing an outline feature based on the input image, the outline feature computing means comprising:
      a first-order filter processing unit performing a filtering process on an outline feature point using a first-order differential Gauss function;
      a second-order filter processing unit performing a filtering process on the outline feature point using a second-order differential Gauss function; and
      a third-order filter processing unit performing a filtering process on the outline feature point using a third-order differential Gauss function.

8. The recognition apparatus according to claim 7, wherein the feature function is a linear sum of any number of the weak learners among the plurality of weak learners that form the tentative learner.

9. The recognition apparatus according to claim 8, wherein any number of a plurality of the features are generated using a plurality of the corresponding feature functions, and wherein the number of the weak learners that form each of the feature function differs.

10. A recognition method for use in a recognition apparatus, the recognition apparatus including feature extracting means for extracting a feature at a feature point in an input image, and detecting means for detecting a target object from the input image by substituting the feature into a learner for detecting the target object to be recognized in an image, the learner being generated using a plurality of training images including a training image that contains the target object to be recognized and a training image that does not contain the target object, the method comprising the steps of:

extracting the feature from the input image using the feature extracting means; and detecting the target object from the input image by substituting the feature into the learner and performing computation using the detecting means;

wherein the learner is formed by generating a tentative learner for detecting the target object from an image, where the tentative learner is formed from a plurality of weak learners through statistical learning using the training images and the feature at the feature point of the training images, and by performing an AdaBoost type statistical learning using the training images and a new feature obtained by substituting the feature obtained from the training images into a feature function formed from at least one of the weak learners of the tentative learner and wherein the feature extracting means comprises outline feature computing means for computing an outline feature based on the input image, the method further comprising:

performing a filtering process, by a first-order filter processing unit included in. the outline feature computing means an outline feature point using a first-order differential Gauss function:

performing a filtering process, by a second-order filter processing unit included in the outline feature computing means, on the outline feature point using a second-order differential Gauss function; and performing a filtering process, by a third-order filter processing unit included in the outline feature computing means, on the outline feature point using a third-order differential Gauss function.

11. A non-transitory computer-readable medium encoded with a computer program, which when executed on a computer, causes the computer to perform a process comprising:

extracting a feature at a feature point in an input image; and detecting a target object from the input image by substituting the feature into a learner for detecting the target object to be recognized in an image, the learner being generated using a plurality of training images including a training image that contains the target object to be recognized and a training image that does not contain the target object;

wherein the learner is formed by generating a tentative learner for detecting the target object from an image, where the tentative learner is formed from a plurality of weak learners through statistical learning using the training images and the feature at the feature point of the training images, and by performing an AdaBoost type statistical learning using the training images and a new feature obtained by substituting the feature obtained from the training images into a feature function formed from at least one of the weak learners of the tentative learner, the process further comprising:

performing a filtering process, by a first-order filter processing unit, on an outline feature point using a first-order differential Gauss function.

performing a filtering process, by a second-order filter processing unit, on the outline feature point using a second-order differential Gauss function; and performing a filtering process, by a third-order filter processing unit, on the outline feature point using a third-order differential Gauss function.

12. A learning apparatus comprising:

a processor;

a feature extracting unit configured to extract a feature at a feature point in a plurality of training images including a training image that contains a target object to be recognized and a training image that does not contain the target object;

a tentative learner generating unit configured to generate a tentative learner for detecting the target object in an image, the tentative learner being formed from a plurality of weak learners through statistical learning using the training images and the feature obtained from the training images; and a learner generating unit configured to generate a final learner that is formed from a plurality of weak learners and that detects the target object in an image by substituting the feature into a feature function formed from at least one of the weak learners that form the tentative learner so as to obtain a new feature and performing an AdaBoost type statistical learning using the new feature and the training images, wherein the feature extracting unit comprises an outline feature computing unit for computing an outline feature based on the training image, the outline feature computing unit comprising:

a first-order filter processing unit performing a filtering process on an outline feature point extracted using a first-order differential Gauss function;

a second-order filter processing unit performing a filtering process on the outline feature point using a second-order differential Gauss function and a third-order filter processing unit performing a filtering process on the outline feature point using a third-order differential Gauss function.

13. A recognition apparatus comprising:

a processor, a feature extracting unit configured to extract a feature at a feature point in an input image; and a detecting unit configured to detect a target object to be recognized from the input image by substituting the feature into a learner for detecting the target object in an image, the learner being generated using a plurality of training images including a training image that contains the target object to be recognized and a training image that does not contain the target object;

wherein the learner is formed by generating a tentative learner that is formed from a plurality of weak learners and that detects the target object in an image through statistical learning using the training images and the feature at the feature point of the training images, and by performing an AdaBoost type statistical learning using the training images and a new feature obtained by substituting the feature obtained from the training images into a feature function formed from at least one of the weak learners that form the tentative learner and wherein the feature extracting unit comprises an outline feature computing unit for computing an outline feature based on the training image the outline feature computing unit comprising:

a first-order filter processing unit performing a filtering process on an outline feature point extracted using a first-order differential Gauss function;

a second-order filter processing unit performing a filtering process on the outline feature point using a second-order differential Gauss function; and a third-order filter processing unit performing a filtering process on the outline feature point using a third-order differential Gauss function.

* * * * *